United States Patent
Li et al.

(10) Patent No.: US 11,936,749 B2
(45) Date of Patent: *Mar. 19, 2024

(54) CROSS-DOMAIN DISCOVERY BETWEEN SERVICE LAYER SYSTEMS AND WEB OF THINGS SYSTEMS

(71) Applicant: Convida Wireless, LLC, Wilmington, DE (US)

(72) Inventors: Xu Li, Plainsboro, NJ (US); Chonggang Wang, Princeton, NJ (US); Quang Ly, North Wales, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,538

(22) Filed: May 19, 2023

(65) Prior Publication Data

US 2023/0300209 A1  Sep. 21, 2023

Related U.S. Application Data

(63) Continuation of application No. 16/959,481, filed as application No. PCT/US2019/012140 on Jan. 3, 2019, now Pat. No. 11,695,841.

(60) Provisional application No. 62/613,212, filed on Jan. 3, 2018.

(51) Int. Cl.
*H04L 67/51* (2022.01)
*H04L 67/125* (2022.01)
*H04W 4/70* (2018.01)

(52) U.S. Cl.
CPC ............ *H04L 67/51* (2022.05); *H04L 67/125* (2013.01); *H04W 4/70* (2018.02)

(58) Field of Classification Search
CPC ..... H04L 67/51; H04L 67/125; H04L 67/565; H04L 67/12; H04W 4/70
See application file for complete search history.

(56) References Cited

U.S. PATENT DOCUMENTS

| | | | |
|---|---|---|---|
| 11,799,711 B2 * | 10/2023 | Ly | H04L 67/146 |
| 2007/0211746 A1 | 9/2007 | Oshikiri et al. | |
| 2014/0136188 A1 | 5/2014 | Wroczynski et al. | |
| 2015/0253997 A1 | 9/2015 | Kessler et al. | |
| 2017/0337813 A1 * | 11/2017 | Taylor | G05D 1/0285 |
| 2019/0349426 A1 | 11/2019 | Smith et al. | |

FOREIGN PATENT DOCUMENTS

| | | |
|---|---|---|
| WO | 2015/168091 A1 | 11/2015 |
| WO | 2016/077713 A1 | 5/2016 |
| WO | 2017/027869 A1 | 2/2017 |

OTHER PUBLICATIONS

One M2M Technical Report, "Study of Abstraction and Semantics Enablements", TR-0007-V2.11.1, XP055790263.
One M2M Technical Report, "WoT Interworking", TR-0042-WoT_Interworking-V0.1.1, XP084025369.

\* cited by examiner

*Primary Examiner* — Sm A Rahman
(74) *Attorney, Agent, or Firm* — BakerHostetler

(57) ABSTRACT

Systems and methods are introduced to enable cross-domain discovery. Systems and methods are also introduced to create representations of resources and information discovered from cross-domain discovery.

20 Claims, 31 Drawing Sheets

EXAMPLE: LED Light

```
{
  "@context": [
    "http://w3c.github.io/wot/w3c-wot-td-context.jsonld",
    { "actuator": "http://example.org/actuator#" }
  ],
  "@type": "Thing",
  "name": "MyLEDThing",
  "base": "coap://myled.example.com:5683/",
  "security": {
    "cat": "token:jwt",
    "alg": "HS256",
    "as": "https://authority-issuing.example.org"
  },
  "interactions": [
    {
      "@type": ["Property", "actuator:onOffStatus"],
      "name": "status",
      "outputData": {"valueType": { "type": "boolean" }},
      "writable": true,
      "links": [{
        "href" : "pwr",
        "mediaType": "application/exi"
      },
      {
        "href": "http://myled.example.com:8080/status",
        "mediaType": "application/json"
      }]
    },
    {
      "@type": ["Action", "actuator:fadeIn"],
      "name": "fadeIn",
      "inputData": {
        "valueType": { "type": "integer" },
        "actuator:unit": "actuator:ms"
      },
      "links": [{
        "href" : "in",
        "mediaType": "application/exi"
      },
      {
        "href": "http://myled.example.com:8080/in",
        "mediaType": "application/json"
      }]
    },
    ...
    {
      "@type": ["Action", "actuator:fadeOut"],
      "name": "fadeOut",
      "inputData": {
        "valueType": { "type": "integer" },
        "actuator:unit": "actuator:ms"
      },
      "links": [{
        "href" : "out",
        "mediaType": "application/exi"
      },
      {
        "href": "http://myled.example.com:8080/out",
        "mediaType": "application/json"
      }]
    },
    {
      "@type": ["Event", "actuator:alert"],
      "name": "criticalCondition",
      "outputData": {"valueType": { "type": "string" }},
      "links": [{
        "href": "ev",
        "mediaType": "application/exi"
      }]
    }
  ]
}
```

FIG. 3

Working Mode Selection for WoT/SL Cross-domain Discovery Service

Please select which working mode you want CDS to operate:

☐ Proactive Cross-domain Discovery and Proactive Interworking Avatar Creation

☐ Proactive Cross-domain Discovery and Reactive Interworking Avatar Creation

☐ Reactive Cross-domain Discovery and Reactive Interworking Avatar Creation

☐ No Interworking Avatar Is Created for Each of Discovered Things

☐ Check if you want to get a notification when CDS is switching to a new working mode during runtime.

[ Submit ]

FIG. 27

CROSS-DOMAIN DISCOVERY BETWEEN SERVICE LAYER SYSTEMS AND WEB OF THINGS SYSTEMS

CROSS-REFERENCE TO RELATED APPLICATIONS

This application is a continuation of U.S. patent application Ser. No. 16/959,481, filed Jul. 1, 2020, which is the National Stage Application of International Patent Application No. PCT/US2019/012140, filed Jan. 3, 2019, which claims the benefit of U.S. Provisional Patent Application No. 62/613,212, filed Jan. 3, 2018, which is hereby incorporated by reference in its entirety.

BACKGROUND

In Web of Things (WoT), a functional virtual entity may be referred to as a "WoT Servient," which may provide access to physical things/devices, which may be referred to as "Things" or "WoT Things." Providing access may comprise actions such as controlling and retrieving status and values from WoT Things.

In general, Things in the WoT architecture may be represented by "Servients", which may usually be hosted directly on the physical Thing. Servients may also provide access to virtual Things, such as a collection of Things (e.g., all lights in a room) or a WoT gateway for legacy devices (e.g., a Bluetooth device connected to a smartphone). In the latter case, servients may be hosted in any feasible manner, such as inside a smartphone, a local gateway, or the cloud. Servients may communicate with each other via the "WoT Interface," a Web API that follows the recommendations of the WoT Information Group (WoT IG). Servients may operate in a client role (i.e., they consume other Things), a server role (i.e., they expose Things and provide capabilities), or both. In general, a WoT Thing (e.g., a legacy device providing a proprietary interface) may have an associated WoT servient, which may be the "representation" of the WoT Thing in the system, with which other WoT servients may interact.

Each WoT Thing may be described by a WoT Thing Description (TD). A WoT Thing Description (TD) may provide semantic metadata of a Thing as well as a functional description of its WoT Interface.

In a WoT-compliant system, discovering a WoT Thing requires accessing the Thing's TD, which may contain information to interact with the Thing and understand the Thing's data. Therefore, the discovery mechanism in the WoT-compliant system may be used to identify desired TDs based on a TD discovery request, as specified by a WoT client/servient. Generally, a WoT Thing (technically the servient) may host its TD directly or publish/register its TD to any other location on the Web (e.g., in a TD Repository).

The oneM2M standard development organization is developing the oneM2M standard, which defines a machine-to-machine (M2M) communications service layer which may be implemented in the form of a "Common Service Entity (CSE)" hosted on one or more nodes of a communications network. The purpose of the oneM2M service layer is to provide "horizontal" services that may be utilized by different "vertical" M2M systems and applications. A CSE may comprise multiple logical functions called "Common Service Functions (CSFs)", such as "Discovery" and "Data Management & Repository".

In oneM2M, the Discovery (DIS) CSF may search information about applications and services, as contained in attributes and resources. In particular, the discovery mechanism in oneM2M is resource-oriented in the sense that the mechanism may be used to identify desired resources based on a discovery request as specified by an originator.

In general, interworking among different systems, such as the oneM2M system and the WoT, may require new logic functionality that may translate content into different information models and may access interfaces that are compliant to different standards (i.e., protocols) implemented by the various systems. In oneM2M, interworking may be based on the use of specialized Interworking Application Entities (IPE) that are interfaced to a CSE.

SUMMARY

Cross-domain discovery of resources and data is a technical issue related to interworking between two disparate systems, such as a WoT system and a oneM2M system. Before two entities in different systems may communicate or interact, the entities may need to first discover each other. For example, one entity in System A may need to discover another entity in System B, and such a process may be referred to as "cross-domain discovery". However, existing M2M systems do not have cross-domain discovery services, limiting the resources available to users and devices in disparate systems. Additionally, cross-domain discovery should allow a user or device to specify filter criteria to find and access specific resources or information as the user or device would within its own system. Embodiments described herein provide methods and systems to enable cross-domain discovery, with and without additional filter criteria. Embodiments described herein also provide methods and systems to enable use of discovered cross-domain resources.

In an aspect, systems and methods are introduced to enable cross-domain discovery. In another aspect, systems and methods are introduced to create representations of resources and information discovered from cross-domain discovery. Such representations may comprise access interfaces corresponding to the system the representation is created in. For example, a representation of a WoT Thing discovered by a oneM2M system may comprise oneM2M access interfaces instead of the Thing's native WoT access interfaces. Embodiments described herein consider solutions where such representations comprise current information and solutions where such representations comprise information that may be updated during discovery.

Embodiments for cross-domain discovery may comprise an apparatus receiving in a first system compliant with a first communications protocol, via a communication network from an other apparatus on the network, a request message to conduct resource discovery for resources matching specified criteria. The request message may comprise a SPARQL RDF-based query and may also comprise a parameter indicating cross-domain discovery should be performed. The specified criteria of the request message may comprise a data content-related constraint. The apparatus may determine resources and interworking avatars (IAs) in the first system that match the specified criteria, wherein each resource and IA has an associated URI. Each IA may comprise a representation of a resource from a second system that is not compliant with the first system, wherein the representation of the resource from the second system may comprise a format compliant with the first system. The apparatus may then send in the first system, via the communication network to the other apparatus on the network, a response message indicating URIs of the resources that match the specified criteria and URIs of the IAs that match the specified criteria. The first system may comprise a system compliant with a oneM2M service layer protocol, and the IAs may comprise oneM2M resource representations of WoT Things. Alternatively, the first system may comprise a system compliant with a WoT protocol, and the IAs may comprise Thing representations of oneM2M resources. The apparatus may also send, to a cross-domain discovery service, a request message for current data of a discovered IA from the resource from the second system the IA represents, and may receive, from the cross-domain discovery service, a response message indicating current data of the IA.

Embodiments described herein may also comprise an apparatus that may discover a resource in a first system compliant with a first communications protocol and create, on a resource host in a second system not compliant with the first system, an interworking avatar (IA) representing the discovered resource in the first system. The IA may be created with an interface for use by entities of the second system. The creating may be initiated before any discovery requests are received. The creating may also be initiated after receiving a request message for cross-domain discovery. The first system may comprise a system compliant with a WoT protocol, and the IA may comprise a oneM2M resource representation of a WoT Thing. Alternatively, the first system may comprise a system compliant with a oneM2M service layer protocol, and the IA may comprise a Thing representation of a oneM2M resource. The apparatus may also receive, from the second system, a request message for current data of the resource, determine the current data of the resource, and send, to the second system, a response message indicating current data of the resource. The apparatus may host a cross-domain discovery service (CDS). The CDS may comprise a common service function of a service layer. The CDS may also comprise a oneM2M resource. The apparatus may also receive a discovery request from the second system, wherein the discovery request comprises a parameter indicating the resource host on which to create the IA.

Embodiments described herein may also comprise an apparatus to receive a discovery request from a first system compliant with a first communications protocol, wherein the discovery request may comprise a parameter indicating a group operation is planned to be conducted over discovered devices. The apparatus may discover one or more devices in a second system not compliant with the first system, create a list of the one or more devices of the second system, and generate a universal resource indicator (URI) for the list. The apparatus may create a group resource in the first system, wherein the group resource comprises the generated URI for the list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 shows an example TD defining an LED Light;

FIG. 27 illustrates an example graphical user interface;

DETAILED DESCRIPTION

Figure 1:
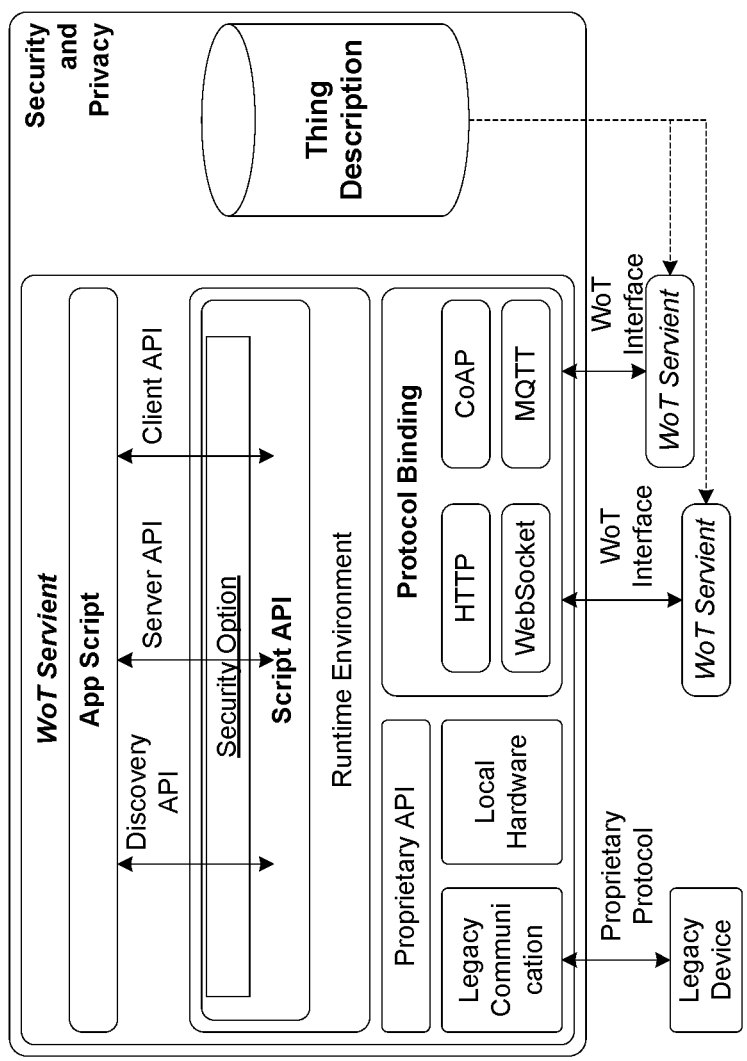
FIG. 1 illustrates a high-level overview of a Web of Things (WoT) Servient functional architecture.

FIG. 1 illustrates a high-level overview of a Web of Things (WoT) Servient functional architecture. In Web of Things (WoT), a functional virtual entity may be referred to as a "WoT Servient," which may provide access to physical things/devices, which may be referred to as "Things" or "WoT Things". Providing access may comprise actions such as controlling and retrieving status and values from WoT Things.

In general, Things in the WoT architecture may be represented by "Servients", which may usually be hosted directly on the physical Thing. Servients may also provide access to virtual Things, such as a collection of Things (e.g., all lights in a room) or a WoT gateway for legacy devices (e.g., a Bluetooth device connected to a smartphone). In the latter case, servients may be hosted in any feasible manner, such as inside a smartphone, a local gateway, or the cloud. Servients may communicate with each other via the "WoT Interface", a Web API that follows the recommendations of the WoT Information Group (WoT IG). Servients may operate in a client role (i.e., they consume other Things), a server role (i.e., they expose Things and provide capabilities), or both. In general, a WoT Thing (e.g., a legacy device providing a proprietary interface) may have an associated WoT servient, which may be the "representation" of the WoT Thing in the system, with which other WoT servients may interact.

Each WoT Thing may be described by a WoT Thing Description (TD). The TD should be acquired in order to use and interact with the Thing because the TD may describe semantics of a Thing as well as its WoT Interface. Typically, Things may directly provide their own TDs, but the TD may also be hosted externally. To ease discovery, TDs may be registered with a well-known TD Repository (TDR), where TDs for Things of interest may be queried.

The application logic of a WoT Thing (or, more technically, a servient) may be implemented natively, for example in device firmware, which is expected to be common for very resource-constrained Things. Following implementations in the Web, however, application logic may be provided by scripts. Such application logic may be supported through a scripting runtime environment—similar to a Web browser—that may be provided by a servient. App scripts may implement application logic in a modular and portable way. Scripts may access local hardware, locally connected legacy devices, and remote Things through the WoT Interface. Portability of such scripts may be ensured through a common Scripting API (Client, Server, Discovery and Propriety) that allows an application to discover Things, to use the client and server functionality of the servient, and to access/control the hardware physically attached to the servient. A scripting API may be similar to an internal API used by application scripts, while a WoT Interface may provide an external interaction interface between different WoT Servients.

A WoT Thing Description (TD) may provide semantic metadata of a Thing as well as a functional description of its WoT Interface. A TD may use the Resource Description Framework (RDF) as an underlying data model. Typically, JSON-LD may be used as a default TD serialization format.

Figure 2:
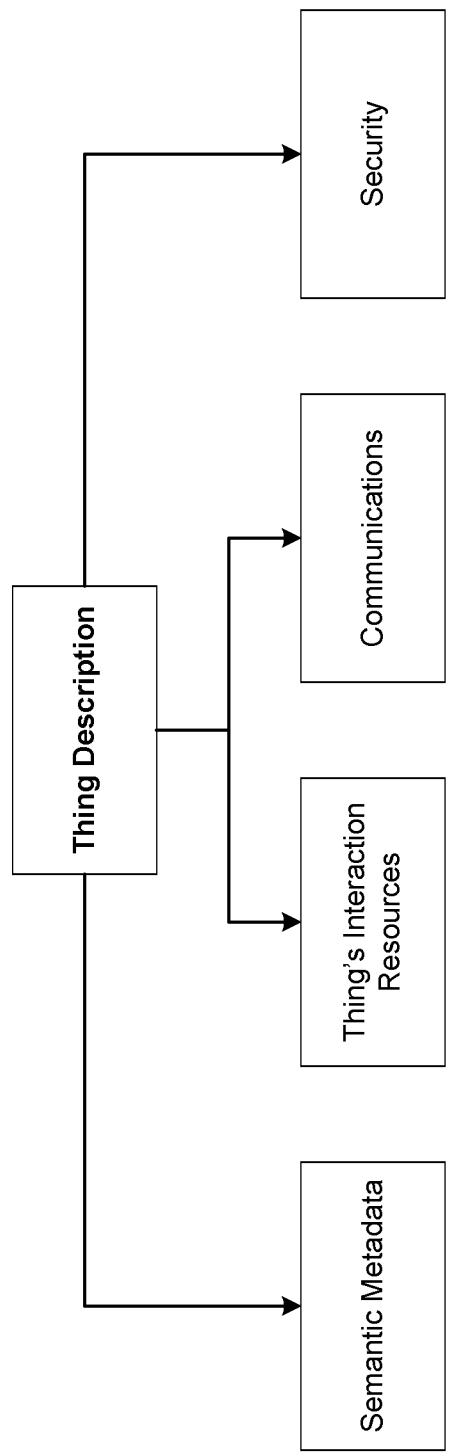
FIG. 2 illustrates an overview of relevant content defined in a TD.

The WoT IG has defined a minimal vocabulary to express the capabilities of a WoT Thing in terms of different interaction patterns: Properties, Actions, and Events. The Property interaction pattern may provide readable and/or writeable data that may be static (e.g., supported mode, rated output voltage, etc.) or dynamic (e.g., current fill level of water, minimum recorded temperature, etc.). The Action interaction pattern may target changes or processes on a Thing that "take a certain time to complete," i.e., actions cannot be applied instantaneously like property writes. Examples of Actions include an LED fade in, moving a robot, brewing a cup of coffee, and other actions that are not instantaneous. Usually, ongoing Actions are modelled as Task resources, which may be created when an Action invocation is received by the Thing. The Event interaction pattern may enable a mechanism for notification by a Thing when a certain condition is met. While some protocols such as CoAP may provide such a mechanism natively, others may not, and Events may need a specific configuration requiring data to be sent and stored on the Thing in a standard way. The TD may provide metadata for different communication bindings (e.g., HTTP, CoAP, etc.), media-Types (e.g., "application/j son", "application/exi", etc.), and security policies (authentication, authorization, etc.). FIG. 2 shows an overview of relevant content defined in a TD.

In practice, a WoT Thing may provide many details about what kind of Thing it is and what the interactions with the Thing mean. Such additional information is the semantic context of the Thing. JSON-LD may provide a means to enable a TD to have an external "semantic" context, which allows for reuse of existing models, thereby enhancing semantic interoperability. Through a context, meaningless strings may become semantically-defined terms that are part of a common vocabulary (i.e., ontology).

FIG. 3 shows an example TD defining an LED Light that supports multiple protocols (i.e., CoAP and HTTP), media-Types (i.e., JSON and EXI), and security policies. FIG. 3 also shows the integration of the actuator namespace (i.e., a concept of "actuator" defined in an ontology), the resulting semantic enrichment on several Properties, such as "actuator:onOffStatus", "actuator:fadeIn", "actuator:fadeOut", and the resulting semantic enrichment on an Event, such as "actuator:alert".

Based on the example TD shown in FIG. 3, the status of the Thing may be requested using a CoAP GET on coap://myled.example.com:5683/pwr ("base URI" from the global scope endpoint definition plus the "href") or an HTTP GET on http://myled.example.com:8080/status. The Thing may be modified using a PUT on the respective URIs because Property is defined as writable. The Actions of the TD may be invoked through a POST to fadeIn (e.g., coap://myled.example.com:5683/in for CoAP) and fadeOut (e.g., coap://myled.example.com:5683/out for CoAP) with an integer value in milliseconds indicating how long the action should last. MyLEDThing also provides an Event called criticalCondition through the CoAP protocol, which enables clients to be informed about problems. The Event may be enabled by a CoAP GET with the Observe option to coap://myled.example.com:5683/ev.

In a WoT-compliant system, discovering a WoT Thing requires accessing the Thing's TD, which may contain information to interact with the Thing and understand the Thing's data. Therefore, the discovery mechanism in the WoT-compliant system may be used to identify desired TDs based on the TD discovery request, as specified by a WoT client/servient. Generally, a WoT Thing (technically the servient) may host its TD directly or publish/register its TD to any other location on the Web (e.g., in a TD Repository). There are several approaches for TD discovery: Manual Discovery, use of a TD Repository, and Local Discovery.

With Manual Discovery, a link to the TD may be provided by a developer at programming time, by an operator through device management, or by the user through a user interface (UI).

Figure 4:
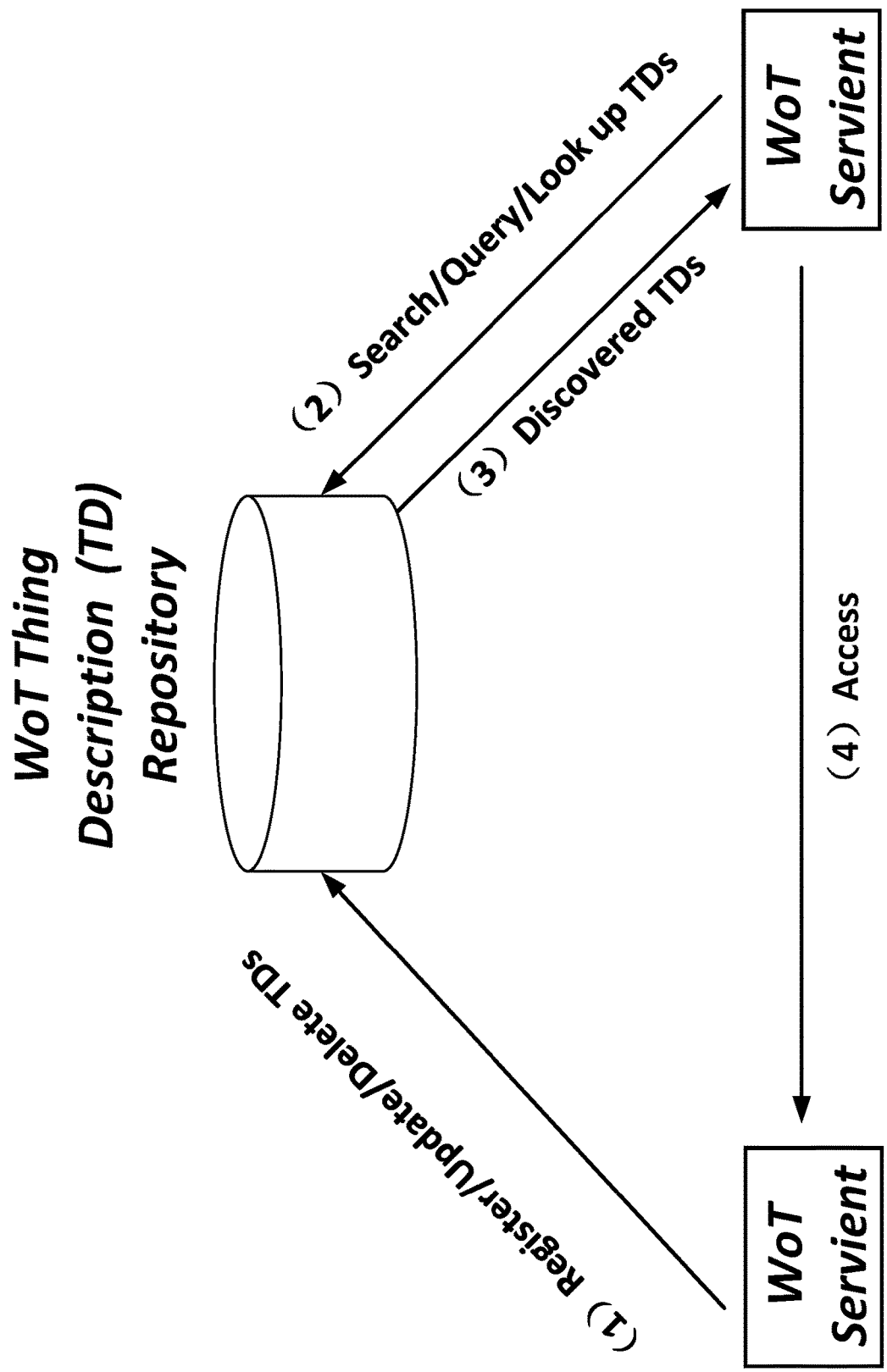
FIG. 4 illustrates an example concept of how TD discovery is performed.

TD discovery may be performed via a TD Repository. The Thing may register the TD with a well-known repository, which may also provide a look-up mechanism. FIG. 4 illustrates an example concept of how TD discovery is performed using a TD repository: (1) A servient may register its TD to a known TD Repository; (2) Another servient may perform a lookup/search/query (e.g., via SPARQL) at the TD repository; (3) The repository may return one or more relevant/desired TDs; and (4) Based on the details in the TD, a connection or access may be initiated.

With Local Discovery, a WoT servient may be able to broadcast a discovery request locally (e.g., a CoAP multicast request for/well-known/core). If another servient has the desired TD(s), that servient may send a response to the broadcasted discovery request, which may include a link to the TD.

Figure 5:
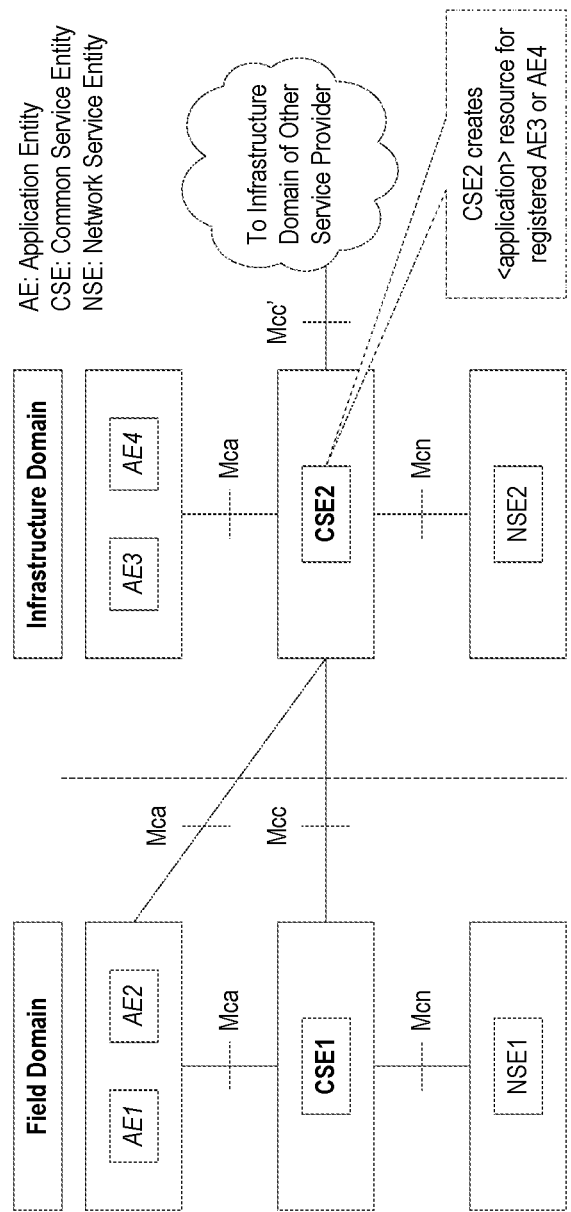
FIG. 5 illustrates an example oneM2M architecture.

The oneM2M standard under development defines a Service Layer called a "Common Service Entity (CSE)". The purpose of the Service Layer is to provide "horizontal" services that may be utilized by different "vertical" M2M systems and applications. The CSE supports four reference points as shown in FIG. 5. The Mca reference point may interface with an Application Entity (AE). The Mcc reference point may interface with another CSE within the same service provider domain, and the Mcc' reference point may interface with another CSE in a different service provider domain. The Mcn reference point may interface with the underlying network service entity (NSE). An NSE may provide underlying network services to the CSEs, such as device management, location services, and device triggering.

Figure 6:
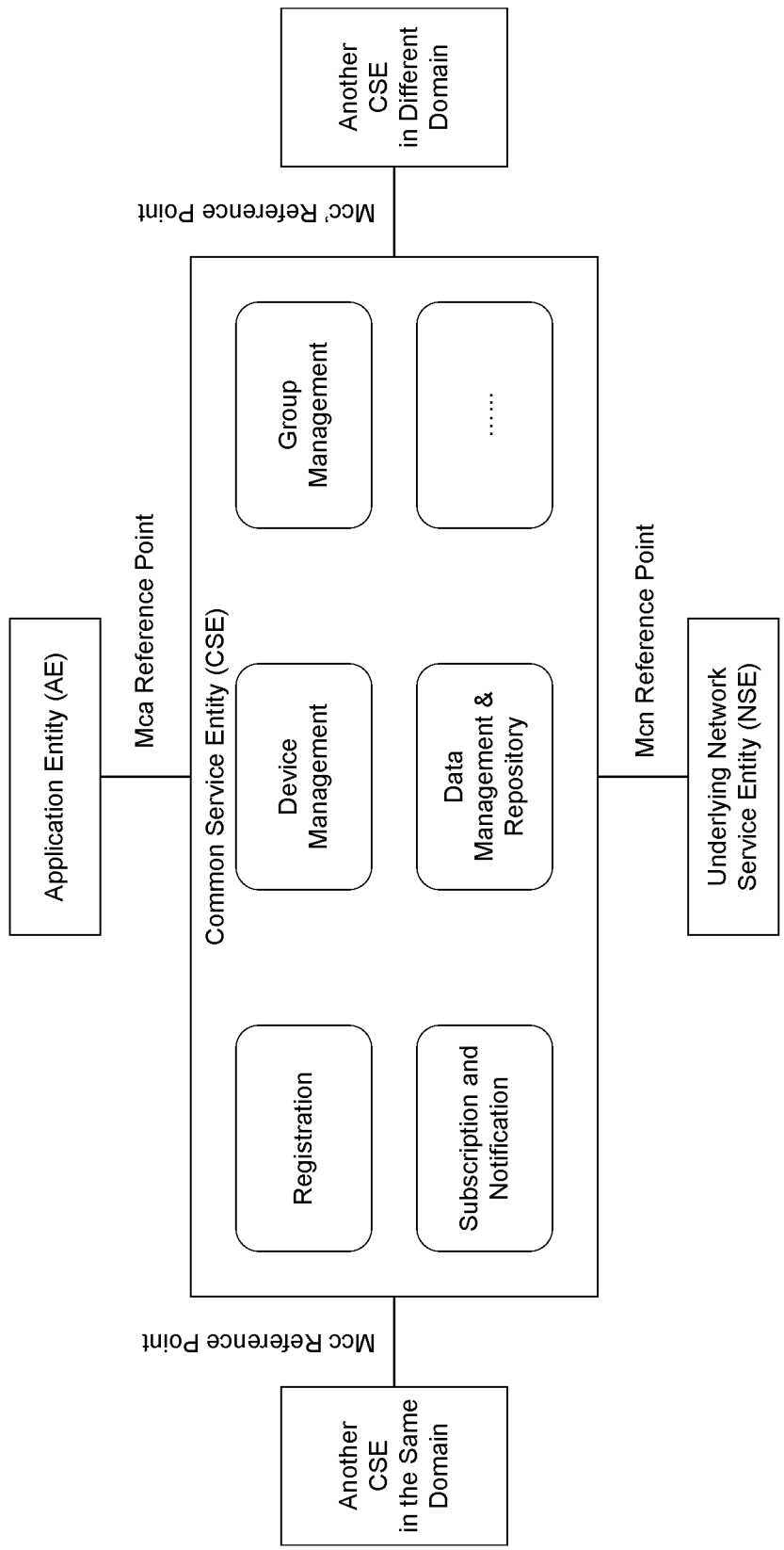
FIG. 6 illustrates example CSFs defined by oneM2M.

A CSE may comprise multiple logical functions called "Common Service Functions (CSFs)", such as "Discovery" and "Data Management & Repository". FIG. 6 illustrates some of the CSFs currently defined by oneM2M.

The oneM2M architecture enables at least the following types of Nodes: an Application Service Node (ASN); an Application Dedicated Node (ADN); a Middle Node (MN); an Infrastructure Node (IN); and a Non-oneM2M Node (NoDN).

An ASN is a Node that may comprise one CSE and at least one Application Entity (AE). An ASN could reside in an M2M Device.

An ADN is a Node that may comprise at least one AE and may not contain a CSE. There may be zero or more ADNs in the Field Domain of the oneM2M System. An AND could reside in a constrained M2M Device.

A MN is a Node that may comprise one CSE and zero or more AEs. There may be zero or more MNs in the Field Domain of the oneM2M System. An MN could reside in an M2M Gateway.

An IN is a Node that may comprise one CSE and zero or more AEs. There may be exactly one IN in the Infrastructure Domain per oneM2M Service Provider. A CSE in an IN may comprise CSE functions not applicable to other node types. An IN could reside in an M2M Service Infrastructure.

A non-oneM2M Node is a Node that does not comprise oneM2M Entities (e.g., neither AEs nor CSEs). Such Nodes may represent devices attached to the oneM2M system for interworking purposes, including management.

Figure 7:
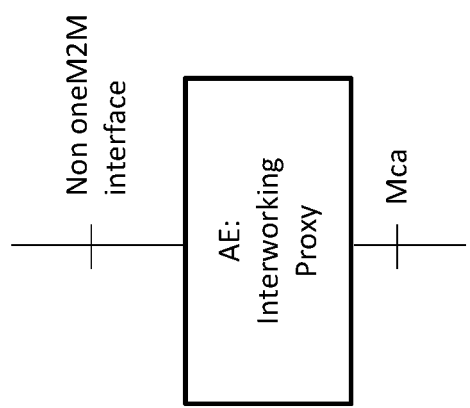
FIG. 7 illustrates an example IPE.

In oneM2M, the interworking solution may be based on the use of specialized Interworking Application Entities (IPE) that are interfaced to the CSE via standard Mca reference points. An example IPE is illustrated in FIG. 7.

In general, interworking may require some new logic functionality (such as IPE in oneM2M) that may translate content into different information models and may access interfaces that are compliant to different standards (i.e., protocols). In oneM2M, IPE is an entity that handles interworking between a oneM2M system and an external system. The IPE may be characterized by the support of a non-oneM2M reference point and by the capability of remapping a related data model to the oneM2M resources exposed via the Mca reference point. For a given external device that is X-compliant (X may refer to any non-oneM2M standard such as WoT), IPE may create corresponding oneM2M resource representations (because oneM2M is resource oriented) in the oneM2M system and those resources may then have oneM2M-compliant access interfaces. Accordingly, CRUD operations on those resources conducted by oneM2M-compliant users may be captured by the IPE, which may further interact with corresponding/original X-compliant devices by translating those CRUD operations into the native operations over the X-compliant interfaces.

In oneM2M, the Discovery (DIS) CSF may search information about applications and services, as contained in attributes and resources. In particular, the discovery mechanism in oneM2M is resource-oriented in the sense that the mechanism may be used to identify desired resources based on the discovery request as specified by an originator. The use of the Filter Criteria parameter of the discovery operation enables limiting the scope of the results. Resource discovery may be accomplished using the RETRIEVE method by an Originator, which may include the root location of where the discovery begins. Upon receiving such a request, the receiving CSE may discover, identify, and return resources and information matching the filter criteria of the discovery request. A successful response may include URIs pertaining to the discovered resources. The Originator may retrieve the resources using such discovered URIs.

Cross Domain Discovery and Interworking

Cross-domain discovery of resources and data is a technical issue related to interworking between two disparate systems, such as a WoT system and a oneM2M system. Before two entities in different systems may communicate or interact, the entities may need to first discover each other. For example, one entity in System A may need to discover another entity in System B, and such a process may be referred to as "cross-domain discovery". However, existing M2M systems do not have cross-domain discovery services, limiting the resources available to users and devices in disparate systems. Additionally, cross-domain discovery should allow a user or device to specify filter criteria to find and access specific resources or information as the user or device would within its own system.

To illustrate the deficiencies of existing systems, consider the following use cases.

Figure 8:
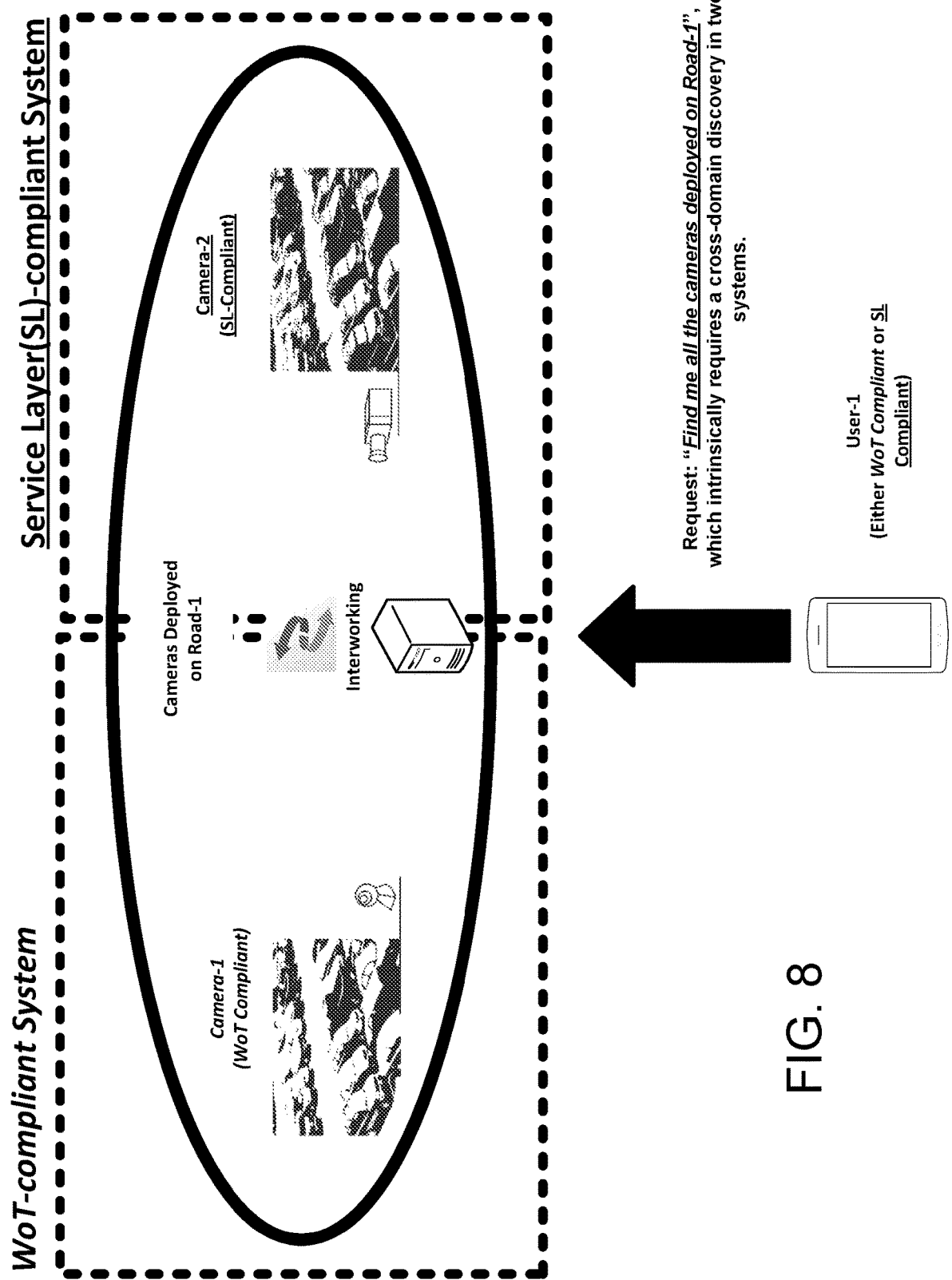
FIG. 8 illustrates an example use case for use of a CDS.

A first use case considers multiple out door cameras. Different organizations and/or parties may deploy outdoor cameras (as IoT devices) for various purposes, such as traffic control, security monitoring, and other relevant purposes. For example, as shown in FIG. 8, two cameras (Camera-1 and Camera-2) are deployed on the same road (i.e., Road-1) by different parties (e.g., one by a governmental department and one by a private company) and those cameras are compliant to different standards. In the example of FIG. 8, Camera-1 is a WoT-compliant device and Camera-2 is an SL-compliant device. These two cameras are deployed at a high elevation (e.g., on light pole along the road) such that the images of these cameras may give a multi-angle overlook of road Road-1. If a user or device, the "client", wishes to check the real-time images of Road-1, the client may need to first discover all of the cameras deployed on Road-1, i.e., Camera-1 and Camera-2 in this example.

The discovery request as specified by the client may only describe application-level needs. For example, in the example shown in FIG. 8, the request is, semantically, "Find me all the cameras deployed on Road-1", which does not specify any low-level details/constraints, such as whether only to look for cameras in the WoT-compliant system, whether only to look for cameras in the SL-compliant system, or any other relevant constraint. Accordingly, such an application-level discovery request intrinsically requires cross-domain discovery in both the WoT-compliant system and the SL-compliant system because the client should be able to find all cameras deployed in Road-1 regardless if they are WoT-compliant or SL-compliant. In general, cross-domain discovery is a technical issue related to interworking between two systems.

Such a discovery request may also have certain limitations for the client. For example, the client may be a WoT-compliant user (or an SL-compliant user), and accordingly, the user may have only the capability of TD discovery in the WoT-compliant system. The user may not be able to conduct resource discovery in the SL-compliant system (and vice versa if the user is an SL-compliant user). The user should rely on a cross-domain discovery service in order to find all desired cameras in both systems. However, such a service does not exist in existing M2M systems.

The first use case, "Use Case 1," describes a basic application scenario that requires cross-domain discovery. A second use case considers a more complicated scenario in which the discovery request has "data content-related constraints," and therefore the cross-domain discovery may be affected by other technical issues, such as the synchronization of data between the first system and the second system.

Figure 9:
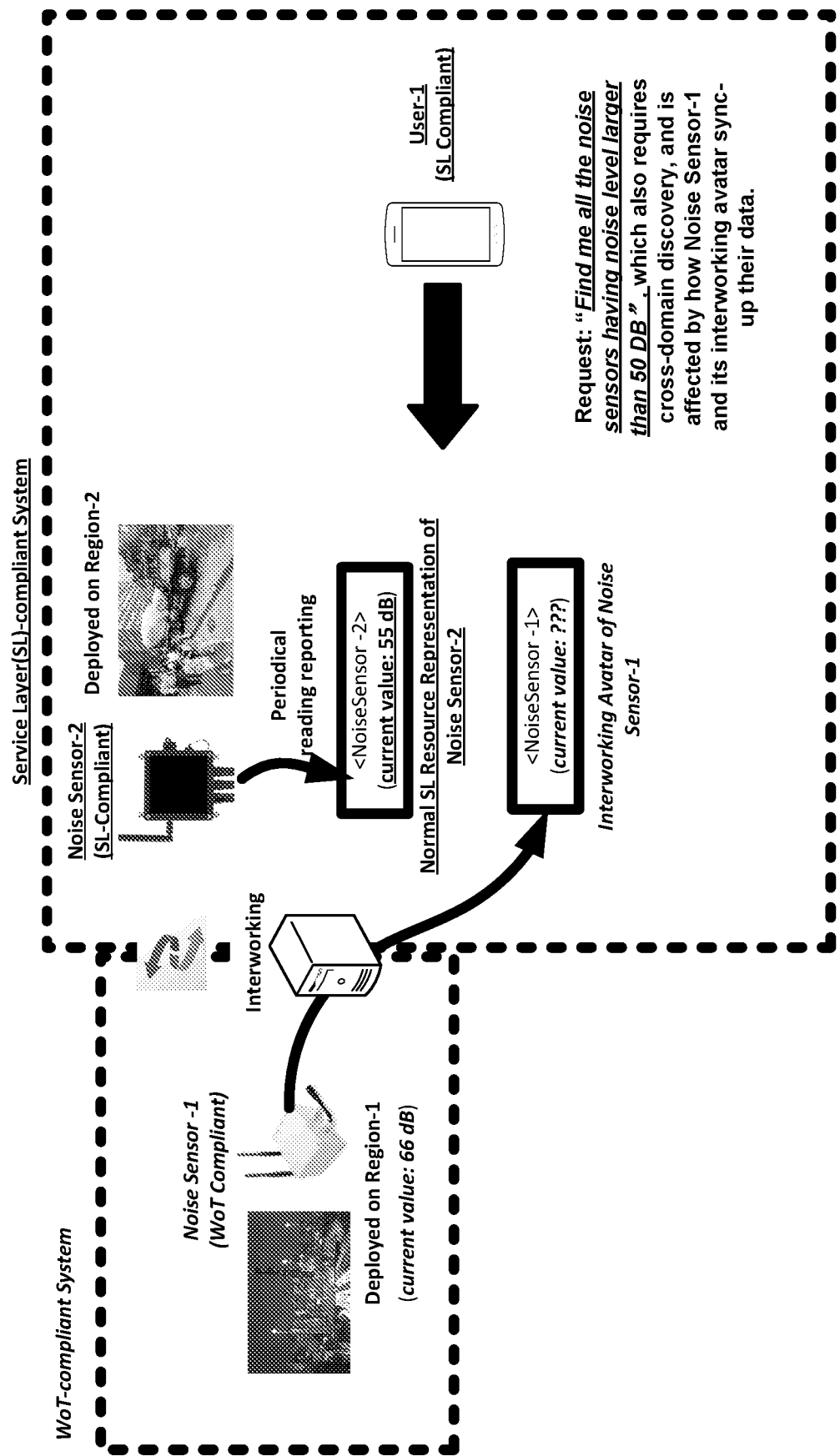
FIG. 9 illustrates another example use case for use of a CDS.

The second use case, "Use Case 2," considers multiple outdoor noise sensors. Different organizations and/or parties may deploy outdoor noise sensors for monitoring real-time downtown area noise levels. For example, as shown in FIG. 9, two noise sensors (Sensor-1 and Sensor-2) are deployed in two different regions (i.e., Region-1 and Region-2, respectively) by different parties and each sensor is compliant to different standards. In the example of FIG. 9, Sensor-1 is a WoT-compliant device and Sensor-2 is an SL-compliant device. If an SL-compliant client (e.g., User-1 shown in FIG. 9) wishes to check which regions in the downtown area are currently noisy, the client may need to discover all the noise sensors deployed in the different regions that currently have a noise reading above a certain threshold, e.g., larger than 50 dB.

Similar to Use Case 1, the discovery request as specified by the client may only describe application-level needs. For example, in the example shown in FIG. 9, the request is, semantically, "Find me all the noise sensors having a noise reading larger than 50 dB". Such an application-level discovery request intrinsically requires cross-domain discovery because as long as a noise sensor has a reading larger than 50 dB, that sensor should be the one satisfying the client's discovery request, regardless if the noise sensor is WoT-compliant or SL-compliant.

Such a discovery request is more complicated than that of Use Case 1 due to the added content-related constraints (e.g., "having a current noise reading larger than 50 dB"). In particular, time-sensitive data of the sensor in the WoT-compliant system, Sensor-1, needs to be accessed by the SL-compliant client to determine if the noise reading of Sensor-1 is larger than 50 dB. Therefore, cross-domain discovery should also comprise mechanisms for data content synchronization between systems. For example, in Use Case 2 illustrated in FIG. 9, Sensor-1 has a representation, referred to as an Interworking Avatar (IA) as described below, on the SL-compliant system. Various synchronization issues may occur because the IA may or may not have real-time data content synchronization with the original device and/or resource. For example, in FIG. 9, for the WoT-compliant noise sensor (Sensor-1), an interworking avatar was created in the SL-compliant system as an SL resource (i.e., <NoiseSensor-1>) such that SL-compliant users (e.g., User-1) may directly interact with Sensor-1 via its IA (i.e., <NoiseSensor-1>) created in the SL-compliant system. However, the SL resource <NoiseSensor-1> may or may not have real-time data content synchronization with the original Sensor-1 in the WoT-compliant system. Because the discovery request issued by User-1 comprises a content-related constraint (i.e., "having a current noise reading larger than 50 dB"), different discovery procedures need to be designed to consider various data synchronization mechanisms between the interworking avatars and their original things/devices so that content-related constraints may be properly evaluated. Embodiments considering synchronization for Use Case 2 include at least the following, as described herein: Proactive Cross-domain Discovery and Proactive IA Creation; Proactive Cross-domain Discovery and Reactive IA Creation; Reactive Cross-domain Discovery and Reactive IA Creation; and No Thing-Specific IA Creation for Discovered Things.

Embodiments described herein provide methods and systems to enable solutions to the problems discussed above, among others. Embodiments may enable cross-domain discovery, with and without additional filter criteria. Embodiments described herein also provide methods and systems to enable use of discovered cross-domain resources. Aspects are introduced to enable such embodiments.

In an aspect, systems and methods are introduced to enable cross-domain discovery.

In another aspect, systems and methods are introduced to create representations of resources and information discovered from cross-domain discovery.

Additionally, embodiments of the described procedures are described with reference to a oneM2M system, a WoT system, and an example Graphical User Interface (GUI) to configure and monitor some of the introduced features.

Although this disclosure mainly considers the cross-domain discovery between a WoT-compliant system and an SL-compliant system, embodiments described herein may be applied to cross-domain discovery between any two systems as long as the cross-discovery mechanisms have similarities or similar purposes as those disclosed herein. Further, while semantic processes may be described herein, procedures described herein are not limited to clients or a cross-domain discovery service having full semantic capability. It should be appreciated that other similar steps should not be construed as limiting with regard to procedures described herein.

Additionally, while embodiments may be described in the context of a WoT Servient, embodiments may also be applied to a WoT Server.

For ease of description, embodiments described herein may use the letter "X", used in terms such as "X-compliant", as a wildcard, which may refer to SL, WoT, or any other standard. If System A is "X-compliant", the access interfaces adopted by System A are compliant to X standard, where X may refer to any standard, such as for example WoT or SL. Accordingly, a native thing/device/entity in an X-compliant system may be referred to as an "X-compliant Thing/Device/Entity" that provides X-compliant access interfaces As used herein, "device" and "thing" may be used interchangeably unless clarified explicitly.

Cross-domain discovery may refer to bi-directional discovery. For example, a WoT native client in a WoT-compliant system may need to discover SL-compliant devices in an SL-compliant system (and vice versa). Different processing details may be needed for two discovery directions. Accordingly, for the solutions in this disclosure, procedures are designed for each discovery direction.

When introducing each solution, embodiments are designed to support the application scenario shown in Use Case 1, described above. Then, additional details are provided to extend the solutions for Use Case 1 to support Use Case 2. In particular, different discovery procedures are designed by considering different data synchronization mechanisms between original devices and/or resources in a system and their corresponding representations in another system. For example, there may be real-time data content synchronization between original devices/resources in a system and their corresponding representations in another system, or there may be no real-time data content synchronization between original devices/resources in a system and their corresponding representations in another system.

In an aspect, systems and methods are introduced to enable cross-domain discovery. A cross-domain discovery architecture is described, in which a new cross-domain discovery service is also described. Different applicable scenarios of the architecture are also described herein.

Figure 10:
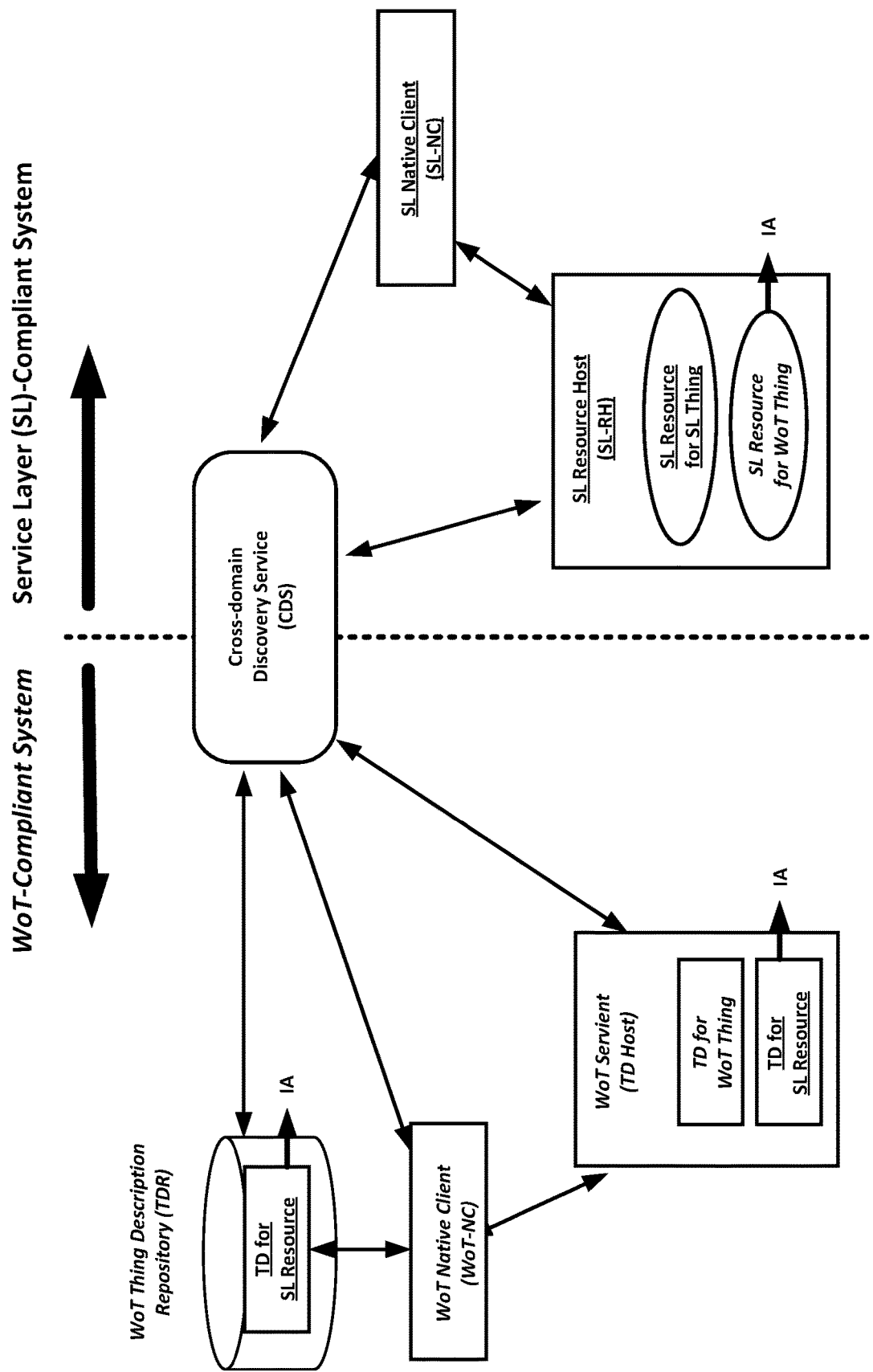
FIG. 10 illustrates an example cross-domain discovery architecture.

An example embodiment of a cross-domain discovery architecture is illustrated in FIG. 10. Each entity shown and described may have certain responsibilities and roles.

A WoT Thing (WoT-T) may be an abstract concept of a physical entity that may either be a real-world artifact, such as a physical device, or a virtual entity that represents physicality, such as a room or group of devices.

A WoT Servient (WoT-S) may be an addressable application endpoint of a WoT Thing that may make the WoT-T interactive by providing a WoT Interface and means to execute application/programming logic. Typically, a given WoT-T (e.g., a legacy device providing a proprietary interface) may have an associated WoT-S, which may be the representation of this WoT Thing in the WoT-compliant system and may be interacted with by other WoT Servients or Clients. A WoT servient may directly host TD(s) such that a servient may also be a "TD Host".

A WoT TD Repository (TDR) may be register for storing TDs and may provide an interface for WoT Servients to register TDs and an additional interface for looking up registered TDs.

A WoT Native Client (WoT-NC) may be a WoT client/servient that has need to discover TDs in a WoT-compliant system and may provide access to other WoT servient(s) based on details in TDs. In particular, a WoT-NC may operate in the WoT-compliant system and may not have any capability or knowledge to interact with an external system, such as an SL-compliant system.

An SL Resource Host (SL-RH) may host SL resources. In an SL-compliant system, an SL-compliant entity, such as a device/gateway/server, may create various SL resources on certain SL nodes, which may be referred to as SL Resource Hosts.

An SL Native Client (SL-NC) may be a client device in an SL-compliant system. An SL-compliant entity (e.g., a device/gateway/server) may be an SL-NC and may conduct resource discovery to identity interested resources created by others. The SL-NC may also enable CRUD access to discovered SL resources. In particular, an SL-NC may operate in the SL-compliant system and may not have any capability or knowledge to interact with an external system, such as a WoT-compliant system.

An Interworking Avatar (IA) is an entity, e.g., a data structure, for supporting cross-domain interworking in the sense that an IA may allow cross-domain devices and/or resources to be accessible in the current domain. In order to support interworking, a resource and/or device in System A that is compliant to a specific standard or communication protocol (e.g., WoT or SL) may have a corresponding representation in another System B, in which the access interface of the representation is compliant to a different standard. Such corresponding representations for supporting interworking may be referred to as "Interworking Avatars." Interworking may refer to bi-directional interworking, and therefore a Thing-1 in System A may have corresponding IA(s) in another System B, such that native users in System B may discover and interact with Thing-1 via the IAs of Thing-1, while in turn a Thing-2 in System B may have corresponding IA(s) in System A, such that native users in System A may discover and interact with Thing-2 via the IAs of Thing-2. Thus, an IA may comprise a data structure in System B that is a copy of information from a data structure/resource/entity from System A, but comprises an interface to be accessible by entities of System B. Therefore, IAs may have different forms in different systems. For example, a TD may be created in a WoT-compliant system, which may be an IA of an SL resource representing an SL-compliant device. Similarly, a WoT-compliant device and its TD may have SL resource representation(s) as IAs created in the SL-compliant system. In an example, an IA may allow an SL-compliant device to be available/accessible in a WoT-compliant System, and vice versa. It may be necessary to enable a WoT-compliant device to also have SL resource representation(s) exposing SL-compliant interface(s) in the SL-compliant system such that SL-compliant clients may discover and interact with the WoT-compliant device via its corresponding SL resource representation, the IA. Similarly, an SL-compliant device may need to have a corresponding TD in the WoT-compliant system such that WoT-compliant users may discover the TD and then interact with the SL-compliant device via a WoT-compliant interface, as specified in the TD (i.e., the TD is also an IA because it makes an SL-compliant device available in the WoT-compliant system). As shown in FIG. 10, the "TD for SL Resource" rectangles on the WoT-compliant system side are IAs that represent SL resources in the WoT-compliant system. Similarly, the ellipse labeled "SL Resource for WoT Thing" on the SL-compliant system side is an IA that represents a WoT-compliant device in the SL-compliant system. Each IA, like each native resource, may have at least an associated URI indicating the IA's location.

A Cross-domain Discovery Service (CDS) is introduced herein. The CDS is a new entity that may enable cross-domain discovery between a WoT-compliant system and an SL-compliant system. In particular, the CDS may have the capabilities to use both WoT-compliant and SL-compliant access interfaces. Because WoT-NCs (or SL-NCs) do not have the capability for direct interaction with an SL-compliant system (or WoT-compliant system), the CDS may be a service that may help such clients with two major functionalities: (1) to conduct cross-domain discovery in both systems; and (2) to create corresponding IAs with desired access interfaces for facilitating cross-domain access. For example, for a given WoT Thing discovered by the CDS for an SL-NC, an IA (i.e., in terms of an SL resource) may be created by the CDS in the SL-compliant system such that the SL-NC may directly interact with the IA via an SL-compliant access interface. Note that, IAs may have different forms in different systems. For example, a WoT TD may be created for an SL resource representing an SL-compliant device. Such a TD may be considered an IA and may be published in the WoT-compliant system. Vice versa, a WoT-compliant device and its TD may also have SL resource representation(s) as IAs created in the SL-compliant system.

There may be many interactions between the entities shown in the example architecture of FIG. 10. For example, a WoT-NC may conduct native TD discovery on a TD Host or in a TDR. Similarly, an SL-NC may conduct native resource discovery on SL-RHs. WoT-NCs and SL-NCs may interact with the CDS such that the CDS may assist in conducting cross-domain discovery in an external system. In addition, the CDS may also be able to proactively conduct TD discovery in the WoT-compliant system (or resource discovery in the SL-compliant system) and create IAs for the discovered/interested TDs or SL resources.

A CDS may be used for conducting cross-domain discovery in both an SL-compliant system and a WoT-compliant system. When integrating different heterogeneous systems together (including SL-compliant systems and WoT-compliant systems as described herein, or any other systems that may be compliant to different standards, such as OCF or other standards), several integration approaches may be adopted, which also lead to different applicable scenarios for the example cross-domain discovery architecture illustrated in FIG. 10. Three different applicable scenarios of the example architecture are described below to cover possible use cases.

Figure 11:
FIG. 11 illustrates an example system integration approach.

A first system integration approach is a "Peer-To-Peer System Integration Approach," as shown in FIG. 11. With this approach, each system may operate individually, and CDS clients may be from either system. For example, clients in this system integration approach may include SL-NCs as well as WoT-NCs, and the CDS may assist these entities in conducting cross-domain discovery.

Figure 12:
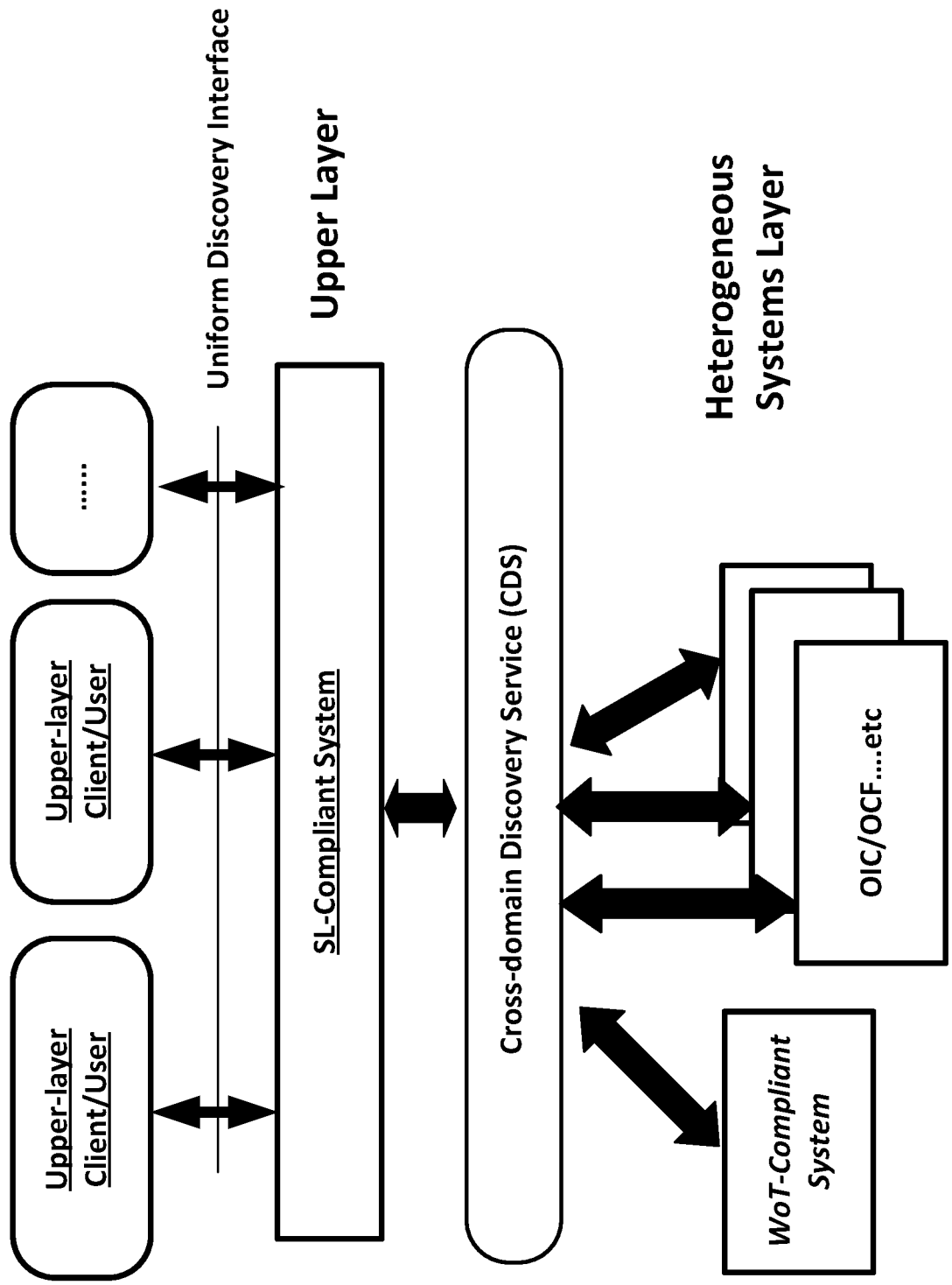
FIG. 12 illustrates another example system integration approach.

Another system integration approach is a "Layered System Integration Approach," as shown in FIG. 12. With this approach, an SL-compliant system may be defined as an upper layer and may be regarded as an "umbrella" layer that provides uniform (i.e., SL-compliant) interfaces and hides system heterogeneity. In this integration approach, most of the clients/users (e.g., on the web or from the Internet) may understand SL-compliant access interfaces, and cross-domain discovery in different heterogeneous systems on the lower layer may be facilitated by a CDS. For example, in FIG. 12, a WoT-compliant system as well as OCF-compliant systems are in the lower layer, referred to as a "heterogeneous systems layer". Though the CDS may focus on cross-domain discovery between the SL-compliant system and the WoT-complaint system, the CDS may be extended to support cross-domain discovery between other systems, such as OCF and other relevant systems. For example, when a client from the top-layer system (e.g., the SL-compliant system) makes a discovery request, such a request may be processed by the CDS, and the CDS may dispatch different discovery requests to multiple low-layer systems. Then, the CDS may integrate those discovery results together and perform IA creation in the top-layer system for those devices discovered in the low-layer systems. The CDS may then return the processed/integrated discovery result to the client.

Figure 13:
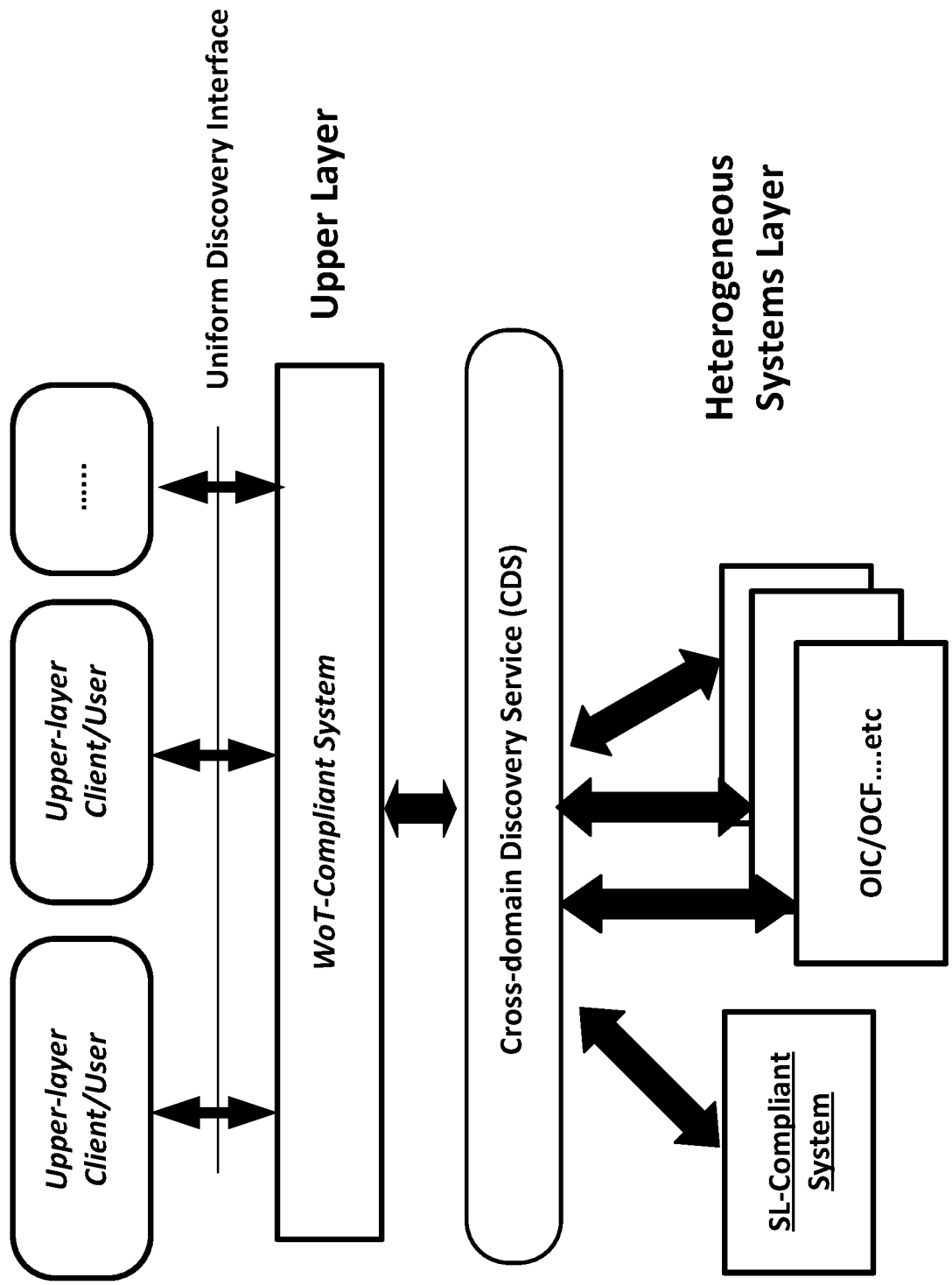
FIG. 13 illustrates yet another example system integration approach.

Similar to the previous system integration approach, a WoT-compliant system may also be placed in the top layer such that the WoT-compliant system may be regarded as an "umbrella" layer that provides uniform (i.e., WoT-compliant) interfaces and hides system heterogeneity. As shown in FIG. 13, an SL-compliant system may be in the lower layer.

Cross-domain discovery and IA creation and synchronization may be performed differently based on synchronization methodology between a device and its corresponding IA. As stated above, embodiments considering synchronization include at least the following: Proactive Cross-domain Discovery and Proactive IA Creation; Proactive Cross-domain Discovery and Reactive IA Creation; Reactive Cross-domain Discovery and Reactive IA Creation; and No IA Creation for Discovered Things.

Example embodiments may perform cross-domain discovery and IA creation and synchronization based on a proactive cross-domain discovery and proactive interworking avatar creation scheme.

As described above, IAs may be created to supporting interworking between two disparate systems. For example, given a WoT-compliant device, it may be preferable to enable a WoT-compliant device to also have an SL resource representation(s) exposing SL-compliant interface(s) in an SL-compliant system such that SL-compliant users may discover and interact with the WoT-compliant device via its corresponding SL resource representation, which is the IA of the WoT-compliant device. In example embodiments, a CDS may "proactively" conduct cross-domain discovery in a system and then "proactively" create corresponding IAs in one or more other systems. Generally, a CDS may discover one or more resources in a first system and then create, on one or more resource hosts in a second system, an IA representing the discovered one or more resources in the first system. More specifically, the IA creation process conducted by the CDS may be decoupled from processing of the discovery requests from SL-NCs and WoT-NCs, and the CDS may determine which SL-RHs the IAs are to be created on. Therefore, whether those IAs may be discovered by SL-NCs in the later stage may depend on whether the SL-NCs initiate resource discovery on the SL-RHs hosting the created IAs. Additionally, WoT-compliant devices may, in advance, have corresponding IAs in the SL-compliant system, and an SL-NC may conduct traditional resource discovery on different SL-RHs in the SL-compliant system to search for the desired resources (e.g., resources representing SL-compliant devices or IAs of WoT-compliant devices). In such embodiments, the CDS may not need to be involved in discovery because the resources/device may already be locatable in the SL-compliant system. Similarly, SL-compliant devices/resources may, in advance, have a corresponding IA (i.e., a TD) created in the WoT-compliant system by the CDS; then a WoT-NC may perform traditional TD discovery to search for desired TDs (e.g., IAs for corresponding SL-compliant devices/resources).

Because a WoT-NC in a WoT-compliant system may need to discover SL-compliant devices in an SL-compliant system (and vice versa), different processing details are described for the two discovery directions.

Figure 14:
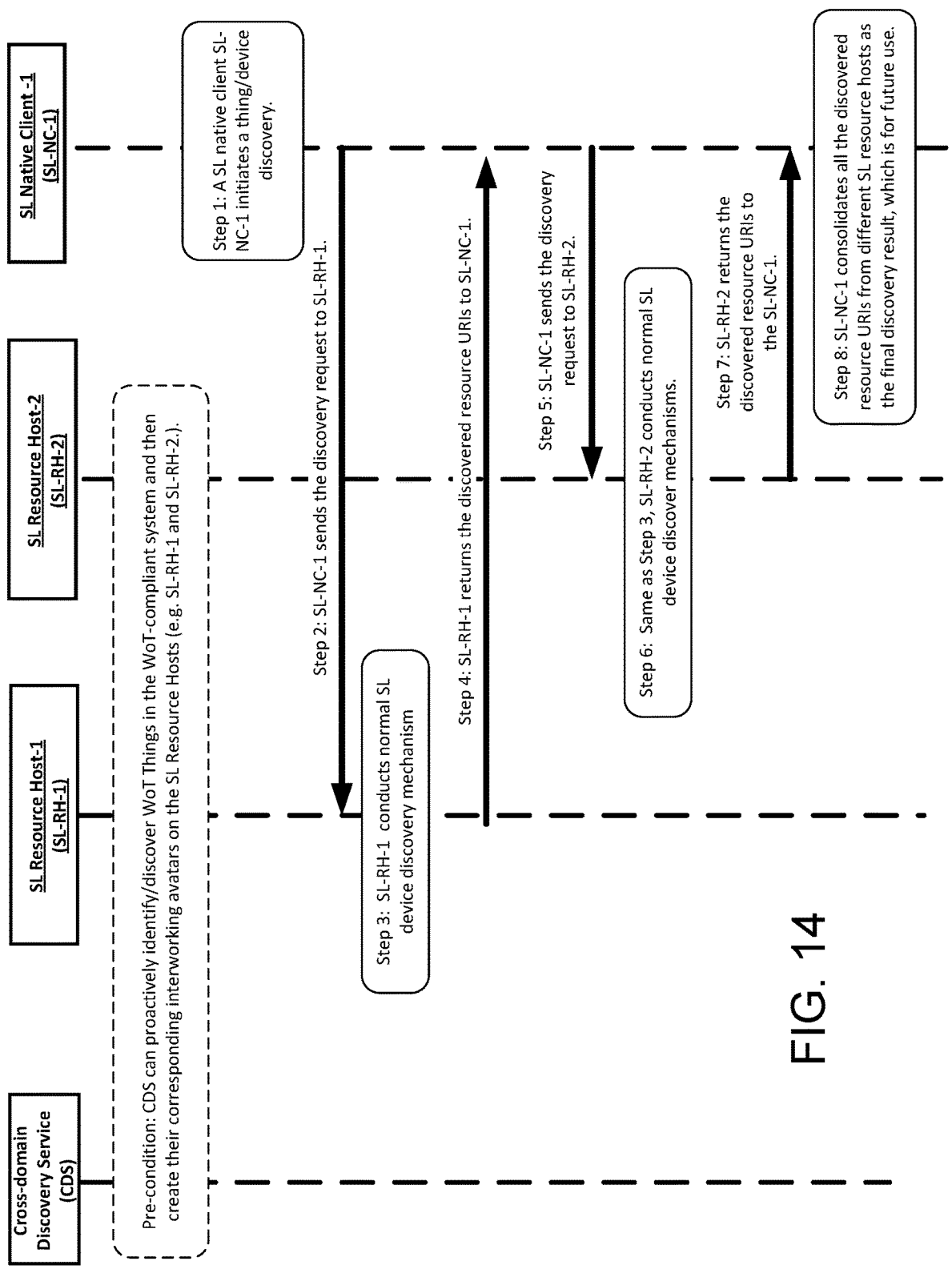
FIG. 14 illustrates an example process for cross-domain discovery for SL-NCs to discover Things in WoT-compliant systems.

FIG. 14 illustrates an example process for cross-domain discovery for SL-NCs to discover Things in WoT-compliant systems. In particular, the example process is designed to support the application scenario of Use Case 1. Details to extend the example process to Use Case 2 are described below in regard to FIG. 16.

The process of FIG. 14 begins with a pre-condition that a CDS may interwork with both a WoT-compliant system and an SL-compliant system and conduct discovery in both systems. In particular, the CDS may proactively identify/discover WoT Things in the WoT-compliant system and then create corresponding IAs as SL resource representations on SL Resource Hosts (e.g., SL-RH-1 and SL-RH-2 in FIG. 14). There may be several events that trigger the CDS to perform proactive discovery. For example, if the CDS receives many discovery requests in a short time and cannot handle them timely, the CDS may switch to perform proactive discovery even if the CDS does not receive any new discovery requests from clients. In another example, the CDS may utilize analytics on its performance history in order to determine when the CDS may receive a large amount of discovery requests. Accordingly, the CDS may choose to conduct proactive discovery in advance of the future discovery requests. Similarly, the CDS may also conduct data analytics to analyze where the clients are located and which SL-RHs are most preferred to create IAs. Accordingly, the CDS may choose to proactively create IAs on those preferred SL-RHs. SL-NCs may not be able to determine whether SL resources are IAs of WoT-compliant things and may regard them as normal SL resources representing SL native things/devices.

At step 1, an SL Native Client SL-NC-1 (e.g., an SL-compliant device) may initiate a thing/device discovery based on its needs. For example, a discovery request may be to find all cameras on Road-1 regardless of whether they are SL-compliant cameras or WoT-compliant cameras. The discovery request may be formulated in different ways. For example, if SL-NC-1 is a semantic-capable client, SL-NC-1 may directly write down this discovery request using a SPARQL RDF-based query statement, and accordingly, the SL-NC-1 may require the CDS or other entities to also have semantic capabilities for processing the SPARQL query statement. Thus, a discovery request message may comprise a SPARQL RDF-based query. Alternatively, if clients and the CDS do not have semantic capability, the semantics of the discovery request may also be described using a normal resource discovery request. For example, in oneM2M, a new resource attribute called "location" may be defined for an <AE> resource representing a camera, and a new filter criteria called "locatedIn" may be defined and set to "Road-1", which may then be checked against the "location" attribute of the <AE> resources representing outdoor cameras.

At step 2, SL-NC-1 may send the discovery request to an SL Resource Host SL-RH-1. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 3, SL-RH-1 may receive the request message from SL-NC-1 to conduct resource discovery for resources matching specified criteria. SL-RH-1 may conduct resource discovery (e.g., either a resource discovery or a semantic resource discovery if IAs also have semantic annotations) in order to determine which resources and/or IAs, if any, satisfy the specified criteria in SL-NC-1's discovery request. It should be appreciated that those resources may represent SL native things/devices or may represent the IAs of WoT-compliant things/devices.

At step 4, SL-RH-1 may return discovered resource URIs to SL-NC-1. For example, SL-RH-1 may send a response message indicating URIs of the resources that match the specified criteria.

At step 5, SL-NC-1 may conduct discovery in another SL-RH. For example, as shown in FIG. 14, SL-NC-1 may send a discovery request to SL Resource Host SL-RH-2.

At step 6, similar to step 3, SL-RH-2 may receive the discovery request from SL-NC-1 and may conduct resource discovery in order to determine resources that satisfy SL-NC-1's discovery request.

At step 7, SL-RH-2 may return the discovered resource URIs to SL-NC-1.

At step 8, SL-NC-1 may consolidate the discovered resource URIs from different SL resource hosts as the final discovery result and save the URIs for future use.

As described above, in the example process shown in FIG. 14, the CDS may determine which SL-RHs the IAs are to be created on. Therefore, whether those IAs may be discovered by SL-NCs in the later stage may depend on whether the SL-NCs initiate resource discovery on the SL-RHs. It is therefore implied that SL-NCs may miss relevant IAs if resource discovery is not initiated on certain SL-RHs. Accordingly, an enhancement for the example process of FIG. 14 is to utilize an existing resource announcement mechanism in order to enlarge the discovery scope for the SL-NCs. For example, an IA created on an SL-RH (e.g., SL-RH-1) may have an announced resource to be created on another SL-RH (e.g., SL-RH-2). Accordingly, an SL-NC may discover this IA even if the SL-NC only conducts discovery on SL-RH-2. An example of such an enhanced process is shown in FIG. 15.

Figure 15:
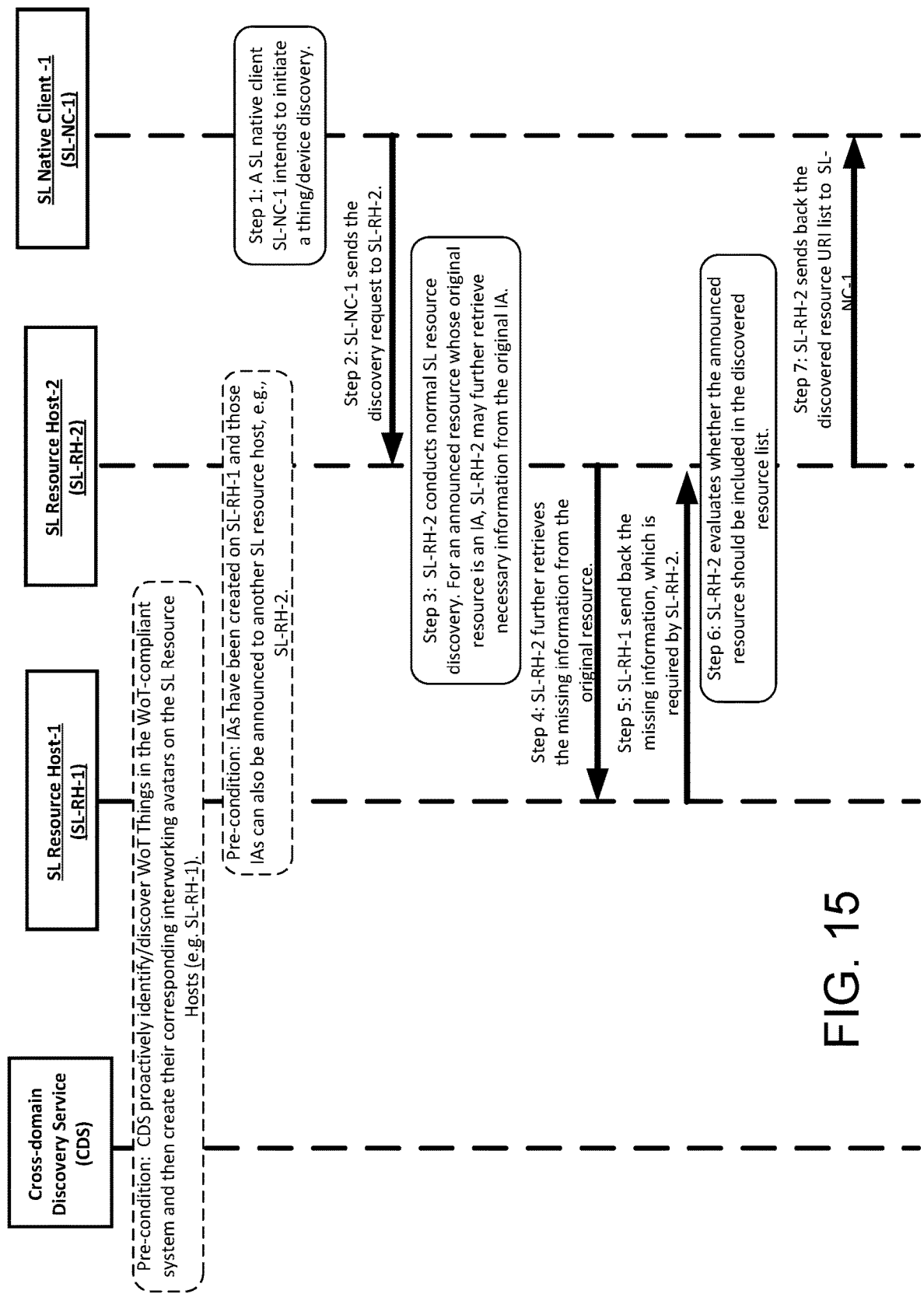
FIG. 15 illustrates another example process for cross-domain discovery for SL-NCs to discover Things in WoT-compliant systems.

The process of FIG. 15 begins with a pre-condition that a CDS may interwork with both a WoT-compliant system and an SL-compliant system and conduct discovery in both systems. In particular, the CDS may proactively identify/discover WoT Things in the WoT-compliant system and then create corresponding IAs as SL resource representations on SL Resource Hosts (e.g., SL-RH-1 and SL-RH-2 in FIG. 15). Additionally, IAs (in terms of SL resources) have been created on SL-RH-1. The CDS may advise SL-RH-1 to announce such IAs to one or more SL-RHs, e.g., SL-RH-2, so that the IAs have more chances to be discovered on different SL-RHs. Alternatively, SL-RH-1 may proactively announce the created IAs to one or more SL-RHs.

At step 1, an SL Native Client SL-NC-1 (e.g., an SL-compliant device) may initiate a thing/device discovery based on its needs. For example, a discovery request may be to find all cameras on Road-1 regardless of whether they are SL-compliant cameras or WoT-compliant cameras.

At step 2, the SL-NC-1 may send the discovery request to SL-RH-2. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 3, SL-RH-2 may receive the discovery request from SL-NC-1 and may conduct resource discovery in order to determine which resources and/or IAs, if any, satisfy SL-NC-1's discovery request. In particular, when cross-domain discovery is required, for an announced resource whose original resource is an IA, SL-RH-2 may further retrieve necessary information from the original IA hosted on SL-RH-1.

At step 4, SL-RH-2 may retrieve the missing information from the original IA.

At step 5, SL-RH-1 may send back the missing information as requested by SL-RH-2.

At step 6, after obtaining the missing information from SL-RH-1, SL-RH-2 may determine whether this IA should be included in the discovered resource list.

At step 7, SL-RH-2 may send back the discovered resource URI list to SL-NC-1.

As described above in Use Case 2, clients' discovery requests may comprise data content-related constraints. For example, an IA was created for the WoT-compliant noise sensor (Sensor-1) in the SL-compliant system as an SL resource (e.g., <NoiseSensor-1>) such that SL-NCs may directly interwork with Sensor-1 through <NoiseSensor-1>. However, <NoiseSensor-1> may or may not have real-time data content synchronization with the original Sensor-1 in the WoT-compliant system. Solutions are described herein that consider various data synchronization mechanisms between IAs and their original devices.

In embodiments with real-time data content synchronization between IAs and their original devices, the processes of FIG. 14 and FIG. 15 may be re-used because the IAs created on SL-RHs may directly store the most up-to-date data generated by the original WoT-compliant devices in the external system. Accordingly, the data content-related constraints may be directly evaluated when processing the discovery request.

Figure 16:
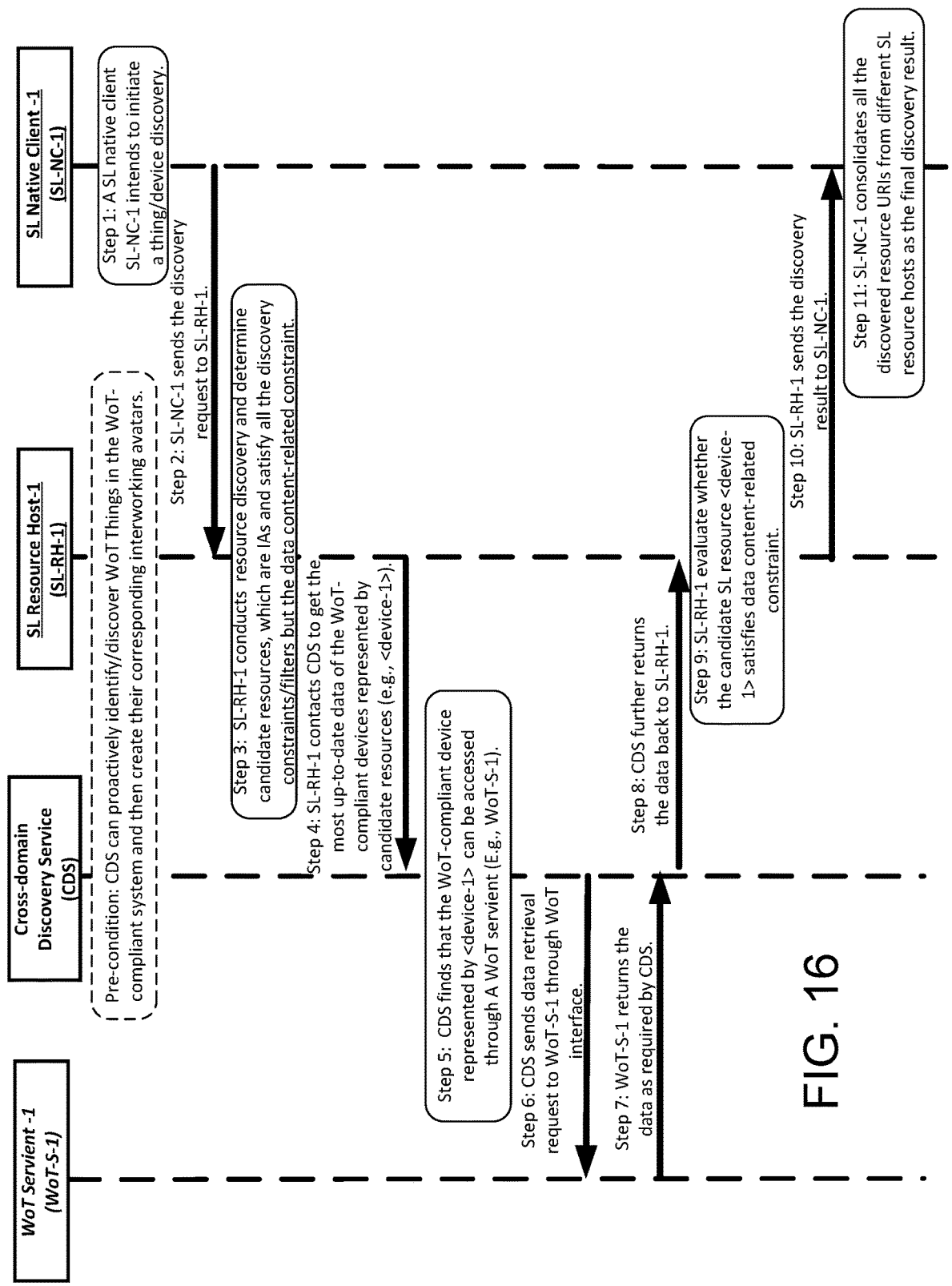
FIG. 16 illustrates yet another example process for cross-domain discovery for SL-NCs to discover Things in WoT-compliant systems.

In embodiments without real-time data content synchronization between IAs and their original devices, the processes of FIG. 14 and FIG. 15 should be extended such that the most up-to-date data may be first retrieved from the original WoT-compliant devices in the external system before the data content-related constraints may be evaluated. FIG. 16 illustrates an example process for synchronizing data before evaluation for discovery.

The process of FIG. 16 begins with a pre-condition that a CDS may proactively identify/discover WoT Things in the WoT-compliant system and then create corresponding IAs as SL resource representations on SL Resource Hosts (e.g., SL-RH-1). The CDS may not conduct real-time data synchronization between original WoT devices and their corresponding IAs in the SL-compliant system.

At step 1, an SL Native Client SL-NC-1 (e.g., an SL-compliant device) may initiate a thing/device discovery based on its needs. For example, a discovery request may be to find all noise sensors having a noise reading larger than 50 dB, as discussed above with respect to Use Case 2.

At step 2, SL-NC-1 may send the discovery request to SL-RH-1. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 3, may receive the discovery request from SL-NC-1 and may conduct resource discovery in order to determine which resources and/or IAs, if any, satisfy SL-NC-1's discovery request. In particular, when cross-domain discovery is required, for the IAs representing WoT-compliant things/devices, only AIs are identified that are "candidate resources" such that they satisfy the discovery constraints/filters, but it is not yet clear if they satisfy the data content-related constraints. For example, a <device-1> resource, which may be an IA of a WoT-compliant device, may be identified as a candidate resource, but SL-RH-1 may need to contact the CDS to receive the most up-to-date data from the original WoT device to determine if <device-1> satisfies the discovery request.

At step 4, SL-RH-1 may send a request message to the CDS to request the most up-to-date data from the original WoT-compliant device represented by SL resource <device-1>. Generally, SL-RH-1 may send a request message, for each discovered IA or for all discovered IAs, to the CDS to request current data from the resource(s)/thing(s) the IA(s) represent. The message may include the following new parameter: Action (act). The act parameter may indicate an action the CDS is expected to take. For example, the action may be to retrieve data from original devices.

At step 5, the CDS may determine that this WoT-compliant device represented by <device-1> may be accessed through a WoT servient (e.g., WoT-S-1).

At step 6, the CDS may send a data retrieval request to WoT-S-1 via a WoT interface to determine the current data from the resource/thing.

At step 7, WoT-S-1 may return the current data requested by the CDS.

At step 8, the CDS may return the current data of the resource/thing back to SL-RH-1.

At step 9: With the data retrieved from the original WoT device, SL-RH-1 finally evaluate whether the candidate SL resource <device-1> satisfies all the discovery constraints (including the data-content related constraints).

Alternatively, compared to the steps shown in steps 6-9, another approach is that the CDS may send a request to WoT-S-1 with a data-content query such that the query may be directly evaluated at WoT-S-1. For example, the CDS may ask WoT-S-1 whether the current noise reading is larger than 50 dB, and WoT-S-1 may return a "True/False" answer instead of returning the current reading.

At step 10, SL-RH-1 may send the discovery result to SL-NC-1, and the URI of <device-1> may be included in the result if <device-1> satisfies the discovery constraints, e.g., if the reading of <device-1> is larger than 50 dB.

At step 11, SL-NC-1 may consolidate the discovered resource URIs from different SL resource hosts as the final discovery result and save the URIs for future use.

Figure 17:
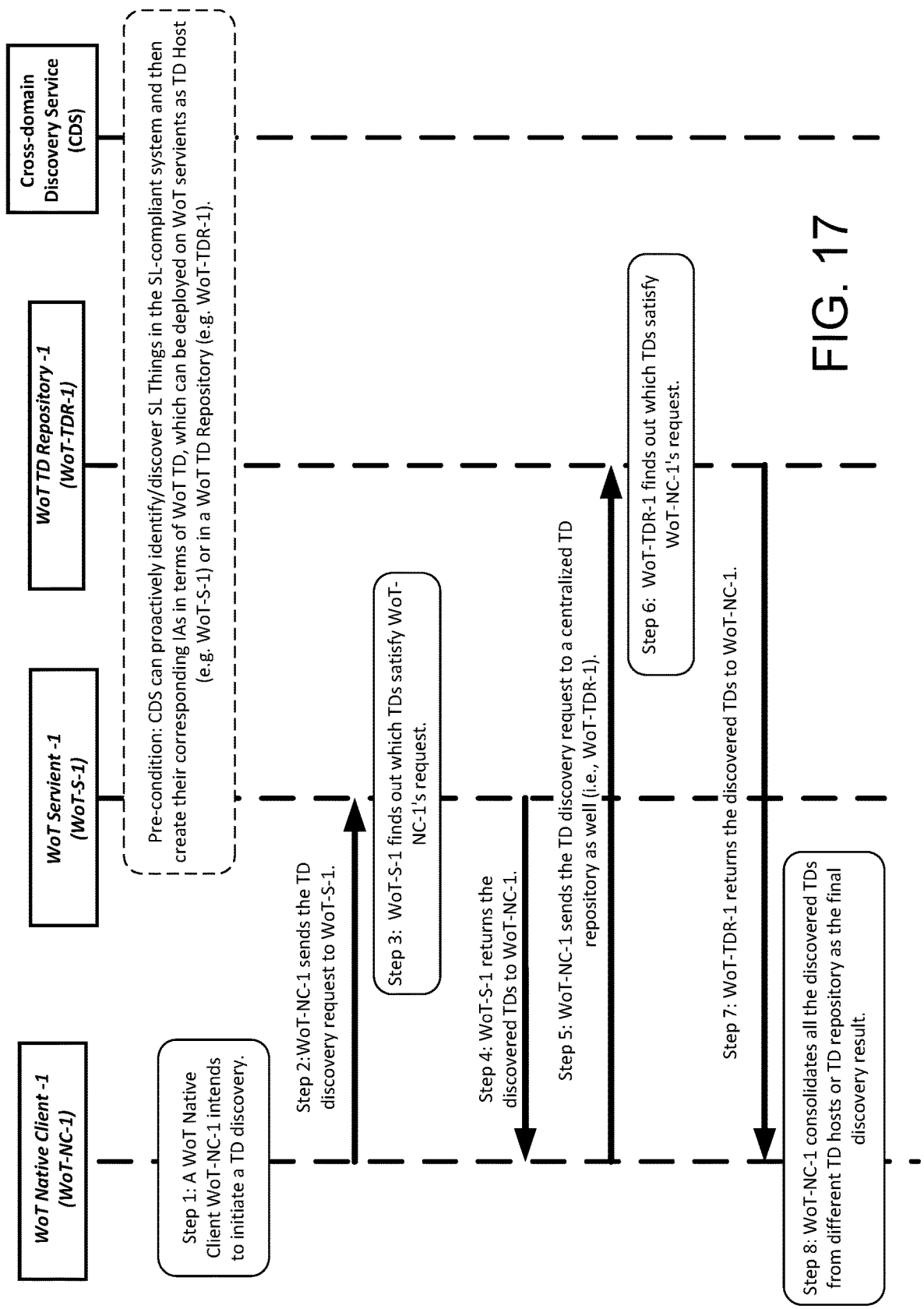
FIG. 17 illustrates an example process for cross-domain discovery for WoT-NCs to discover things in an SL-compliant system.

FIG. 17 illustrates an example process for cross-domain discovery for the direction that WoT-NCs may discover things in an SL-compliant system. In particular, the example process is designed to support the application scenario of Use Case 1. Details to extend the example process to Use Case 2 are described below in regard to FIG. 18.

The process of FIG. 17 begins with a pre-condition that a CDS may proactively identify/discover SL Things in the SL-compliant system and then create corresponding IAs as WoT TDs on WoT servients such as TD Host (e.g., WoT-S-1) or in a WoT TD Repository (e.g., WoT-TDR-1). In addition to the TD created as an SL-complaint device's IA, a WoT servient may be assigned to this SL-compliant device (a determination that may be decided by the CDS) and may be the access endpoint for receiving accessing requests from WoT-NCs when they interact with this SL-compliant thing. For example, access requests received by the delegated servient may be forwarded to the CDS for processing. For the CDS to process such requests, access details (e.g., Base URIs and other access details) provided by the delegated WoT servient should also be described in the TD created as the SL-complaint device's IA.

At step 1, a WoT Native Client WoT-NC-1 may initiate a TD discovery based on its needs. For example, a discovery request may be to find all cameras on Road-1 regardless of whether they are SL-compliant cameras or WoT-compliant cameras.

At step 2, WoT-NC-1 may send the TD discovery request to WoT-S-1. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 3, WoT-S-1 may receive the discovery request from WoT-NC-1 and determine which TDs, if any, satisfy WoT-NC-1's request. It should be appreciated that such TDs may represent WoT native things/devices or may be the IAs of SL-compliant things/devices.

At step 4, WoT-S-1 may return the discovered TDs to WoT-NC-1.

At step 5, WoT-NC-1 may send the TD discovery request to a centralized TD repository (e.g., WoT-TDR-1) to determine whether TDs match the discovery request. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 6, WoT-TDR-1 may receive the discovery request from WoT-NC-1 and determine which TDs satisfy WoT-NC-1's request.

At step 7, WoT-TDR-1 may return the discovered TDs to WoT-NC-1.

At step 8, WoT-NC-1 may consolidate the discovered TDs from different TD hosts or the TD repository as the final discovery result and save the URIs for future use.

As described above in Use Case 2, clients' discovery requests may comprise data content-related constraints. Three solutions are described herein that consider various data synchronization mechanisms between IAs and their original devices.

In example embodiments with real-time data content synchronization between the corresponding delegated servients of the SL-compliant things in the WoT-compliant system and the original devices in the SL-compliant system, the created TDs as IAs of SL-compliant things may be hosted on their corresponding delegated servients. In such embodiments, the example process of FIG. 17 may be re-used because the created TD as the IA of an SL-compliant thing may be directly hosted on its corresponding delegated servient, which may have the most up-to-date data generated by the original SL-compliant device because of the real-time data synchronization. Therefore, step 3 of the example process in FIG. 17 may be extended such that when WoT-S-1 receives the discovery request from WoT-NC-1 (in which the data content related constraints may be included), WoT-S-1 may determine which TDs (as IAs) satisfy WoT-NC-1's request. For the data content-related constraints, WoT-S-1 may directly evaluate those constraints by examining the data currently stored on it because the data is synchronized in real-time with the original devices in the SL-compliant system. It should be appreciated that the above-described extension may also be used for normal TD discovery within a WoT-compliant system if the TD discovery request includes data content related constraints.

In other example embodiments with real-time data content synchronization between the corresponding delegated servients of the SL-compliant things in the WoT-compliant system and the original devices in the SL-compliant system, the created TDs as IAs of SL-compliant things may be stored in a TDR. In such embodiments, the example process of FIG. 17 may be re-used. In order to do so, step 6 of the example process in FIG. 17 may be extended such that when WoT-TDR-1 receives the discovery request from WoT-NC-1 (in which the data content related constraints may be included), WoT-TDR-1 may determine the "candidate TDs" such that they satisfy the discovery constraints/filters, but it is not yet clear if they satisfy the data content-related constraints. For those candidate TDs, WoT-TDR-1 may further contact their corresponding delegated servients to retrieve the most up-to-date data in order to further evaluate the data content-related constraints and return the TDs satisfying the discovery constraints, including the data content-related constraints. It should be appreciated that the above-described extension may also be used for normal TD discovery within a WoT-compliant system if the TD discovery request includes data content related constraints.

The above example embodiments assume that the up-to-date data is hosted/stored in the delegated servients. Alternatively, it is also possible that the up-to-date data may be directly described in the TD. Such TDs may be dynamically updated to reflect real-time status. In such embodiments, the above extensions to the example process of FIG. 17 may also be applied.

Figure 18:
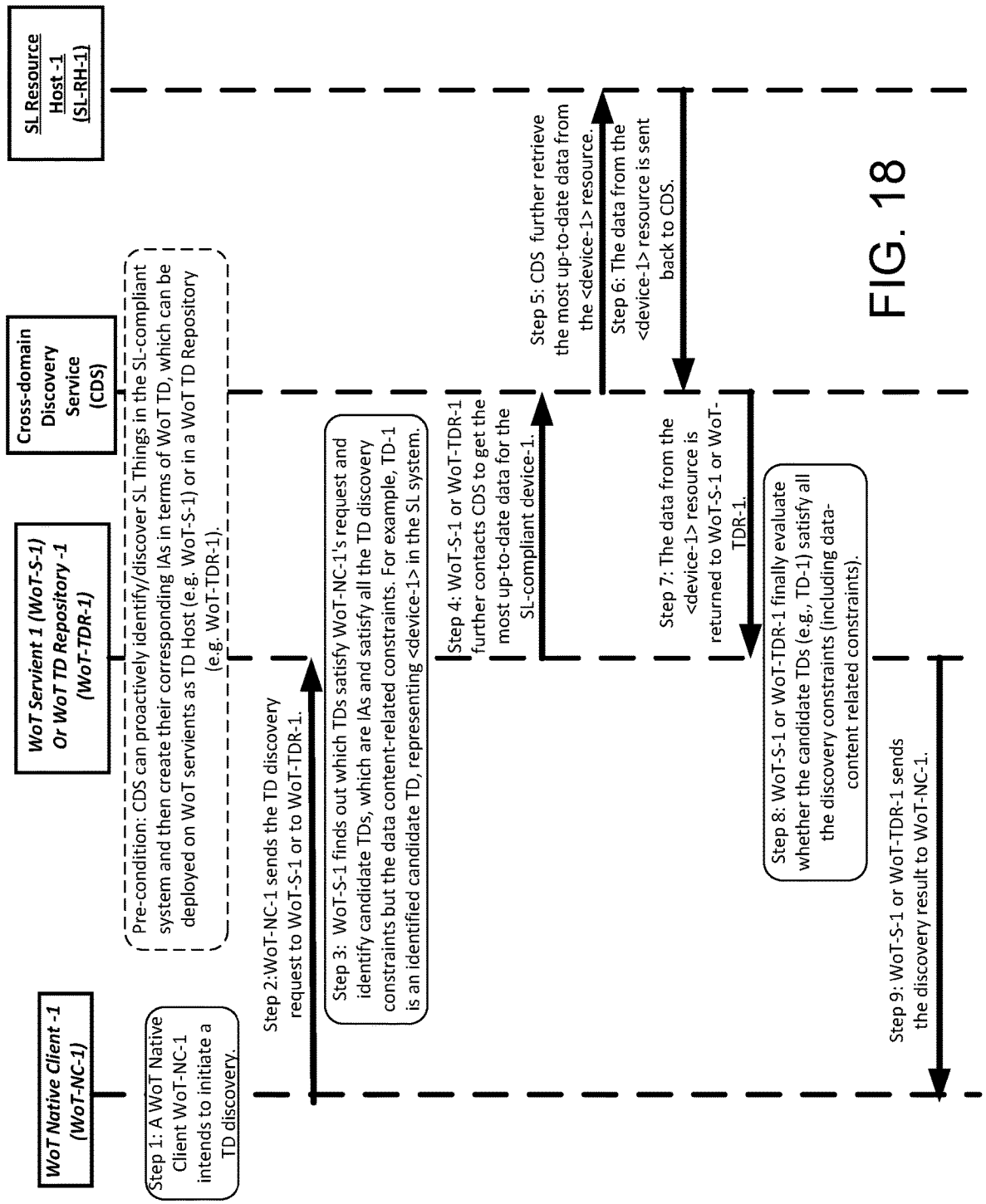
FIG. 18 illustrates another example process for cross-domain discovery for WoT-NCs to discover things in an SL-compliant system.

In embodiments without real-time data content synchronization between IAs and their original devices, the process of FIG. 17 should be extended such that the most up-to-date data may be first retrieved from the original SL-compliant devices in the SL-compliant system before the data content-related constraints may be evaluated. FIG. 18 illustrates an example process for synchronizing data before evaluation for discovery.

The process of FIG. 18 begins with a pre-condition that a CDS may proactively identify/discover SL Things in the SL-compliant system and may then create their corresponding IAs as WoT TDs, which may be deployed on WoT servients as TD Hosts (e.g., WoT-S-1) or in a WoT TD Repository (e.g. WoT-TDR-1).

At step 1, a WoT Native Client WoT-NC-1 may initiate a TD discovery based on its needs. For example, a discovery request may be to find all noise sensors having a noise reading larger than 50 dB, as discussed above with respect to Use Case 2.

At step 2, WoT-NC-1 may send the TD discovery request to WoT-S-1 or to WoT-TDR-1 to determine whether there are desired TDs hosted on it. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients.

At step 3, WoT-S-1 may receive the discovery request from WoT-NC-1 and determine which TDs satisfy WoT-NC-1's request. In particular, when cross-domain discovery is required, for the TDs representing SL-compliant things/devices as IAs, only IAs are identified that are candidate TDs such that they satisfy the discovery constraints/filters, but it is not yet clear if they satisfy the data content-related constraints. For example, TD-1, which may be an IA of an SL-compliant device (whose SL resource representation is <device-1> in the SL system), may be identified as a candidate TD, but WoT-S-1 or WoT-TDR-1 may need to contact the CDS to receive the most up-to-date data from the original SL-compliant device to determine if TD-1 satisfies the discovery request.

At step 4, WoT-S-1 or WoT-TDR-1 may contact the CDS to request the most up-to-date data from the SL-compliant device-1. The message may include the following new parameter: Action (act). The act parameter may indicate an action the CDS is expected to take. For example, the action may be to retrieve data from original devices.

At step 5, the CDS may retrieve the most up-to-date data for TD-1 from the <device-1> resource.

At step 6, the data from <device-1> resource may be sent back to the CDS.

At step 7, the data from <device-1> resource may be returned to WoT-S-1 or WoT-TDR-1.

Alternatively, compared to the steps shown in steps 5-7, another approach is that the CDS may send a data-content query request to <device-1> such that the query may be directly evaluated at SL-RH-1 hosting <device-1>. For example, the CDS may ask <device-1> whether the current noise reading is larger than 50 dB, and SL-RH-1 may return a "True/False" answer, instead of returning the current reading.

At step 8, with the data retrieved from the original SL device, WoT-S-1 or WoT-TDR-1 may evaluate whether the candidate TDs (e.g., TD-1) satisfy the discovery constraints, including data-content related constraints.

At step 9, WoT-S-1 or WoT-TDR-1 may send the discovery result to WoT-NC-1. TD-1 or its TD link may be included if TD-1 satisfies the discovery constraints.

Example embodiments may perform cross-domain discovery and IA creation and synchronization based on a proactive cross-domain discovery and reactive interworking avatar creation scheme.

As described above, a CDS may "proactively" conduct cross-domain discovery in a system and then "proactively" create corresponding IAs in one or more other systems. In such example embodiments, the CDS may determine which SL-RHs the IAs are to be created on. However, such a solution lacks flexibility because IA creation is decided entirely by the CDS, without considering needs of a client. For example, when an SL-NC attempts to discover desired things in a WoT-compliant system, the SL-NC may prefer to have IAs created and hosted on a desired SL-RH, such as the SL-RH that is easiest and/or closest to access. To address such a preference or need, the CDS may still proactively conduct cross-domain discovery in a system, however, the CDS may "reactively" conduct IA creation in another system. Reactive IA creations may be triggered by discovery requests from SL/WoT clients and may also consider the needs of clients.

Figure 19:
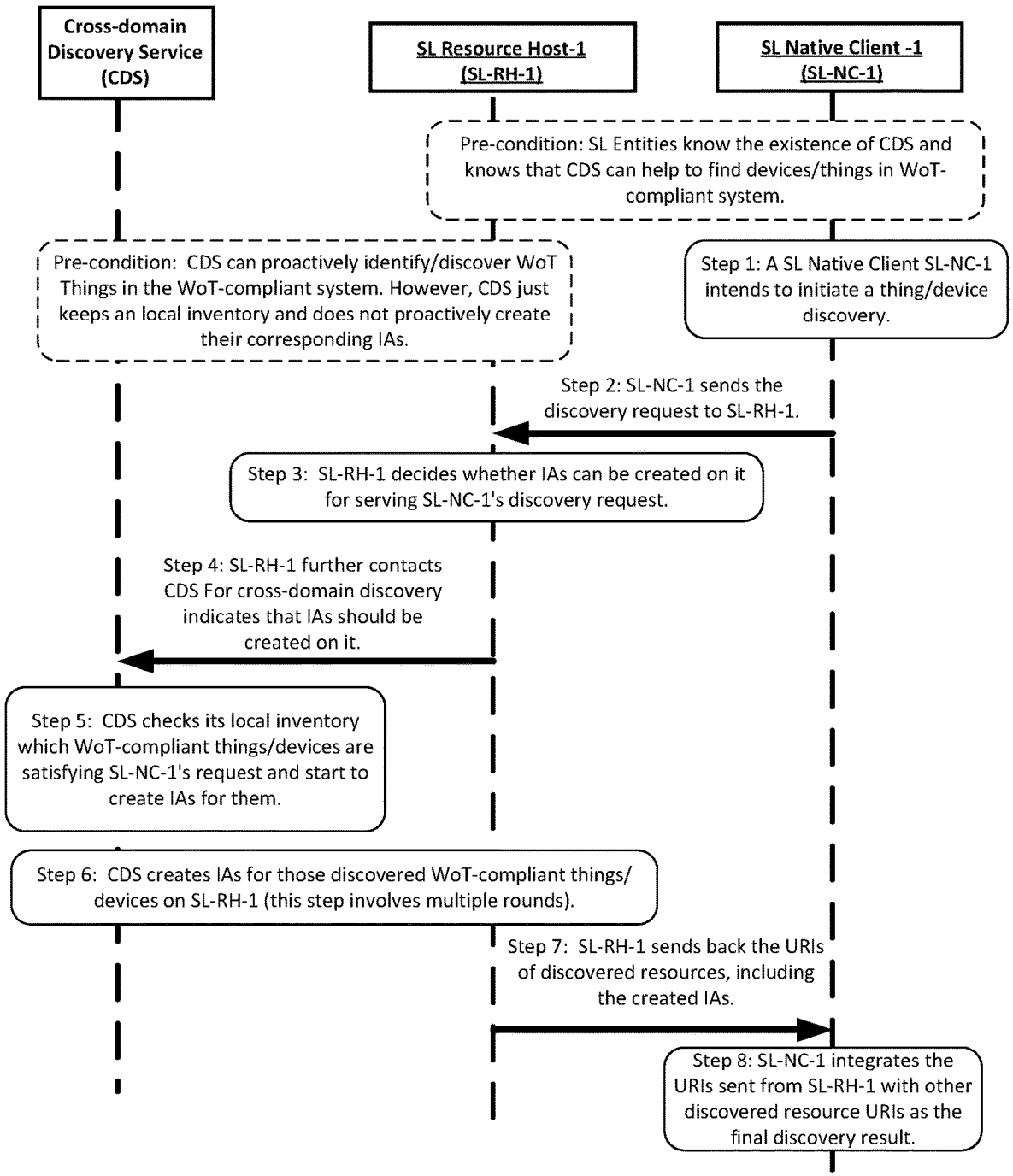
FIG. 19 illustrates another example process for cross-domain discovery for SL-NCs to discover things in WoT-compliant systems.

FIG. 19 illustrates an example process for cross-domain discovery for SL-NCs to discover things in WoT-compliant systems. In particular, the example process is designed to support the application scenario of Use Case 1. Details to adopt/extend the example process to Use Case 2 are also described below.

The process of FIG. 19 begins with a pre-condition that a CDS may proactively identify/discover WoT Things in a WoT-compliant system. However, the CDS may keep a "local inventory" and may not proactively create corresponding IAs on SL-RHs. Instead, SL entities may utilize the CDS to assist in finding devices/things in the WoT-compliant system.

At step 1, an SL Native Client SL-NC-1 may initiate a thing/device discovery based on its needs. For example, a discovery request may be to find all cameras on Road-1 regardless of whether they are SL-compliant cameras or WoT-compliant cameras. SL-NC-1 may indicate that it may utilize the cross-domain discovery capability of the CDS. Accordingly, if SL-NC-1 is sending the request to a resource host such as SL-RH-1, it is assumed that the SL-NC-1 prefers SL-RH-1 as the desired resource host for the IAs to be created.

At step 2, SL-NC-1 may send the discovery request to SL-RH-1. The request may comprise the following new parameter: Cross-domain_Discovery_Indicator (cdi). The cdi may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

Alternatively, SL-NC-1 may directly send its discovery request to the CDS to trigger a cross-domain discovery. In such embodiments, steps 2-4 may be skipped. The request may comprise the following new parameters: Cross-domain_ Discovery_Indicator (cdi); Action (act); and Desired_Resource_Host (drh).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The act parameter may indicate an action the CDS is expected to take. For example, the action may be to conduct cross-domain discovery. The CDS may also make a decision based on its local policy in order to decide whether the required action is permitted for this request.

The drh parameter may indicate which resource host is the desired RH that IAs should be created on. For example, the CDS may be responsible for checking with the desired resource host whether the RH allows IAs to be created on it, e.g., SL-RH-1 in FIG. 19. Generally, this parameter may include a list of RHs.

At step 3, SL-RH-1 may receive the discovery request from SL-NC-1 and may decide whether IAs may be created on it for serving SL-NC-1's discovery request. It should be appreciated that, even if SL-NC-1 did not indicate the cross-domain discovery is needed as described in step 2, the SL-RH-1 may initiate cross-domain discovery by itself.

At step 4, SL-RH-1 may create a new discovery request that may be processed by the CDS and may send the discovery request to the CDS. SL-RH-1 may also indicate that for the discovered WoT-compliant devices, their corresponding IAs should be created on SL-RH-1. The request may comprise the following new parameters: Action (act); and selected_Resource_Host (srh). The act parameter may indicate an action the CDS is expected to take. For example, the action may be to conduct cross-domain discovery. The CDS may also make a decision based on its local policy in order to decide whether the required action is permitted for this request. The srh parameter may indicate which resource host is the selected RH that IAs should be created on, e.g., SL-RH-1 in FIG. 19.

At step 5, the CDS may receive the discovery request and may check its local inventory for WoT-compliant things/devices that satisfy SL-NC-1's request. Accordingly, the CDS may create IAs for those discovered things/devices on SL-RH-1 if they do not already exist.

At step 6, the CDS may create IAs for those discovered WoT-compliant things/devices on SL-RH-1. This step may be repeated for each discovered WoT-compliant thing/device that does not already have an IA.

At step 7, SL-RH-1 may send back the URIs of discovered resources to SL-NC-1, including the IAs just created in step 6.

At step 8, SL-NC-1 may consolidate the URIs sent from SL-RH-1 with other discovered resource URIs (e.g., discovered via other approaches) as the final discovery result and save the URIs for future use.

As described above in Use Case 2, clients' discovery requests may comprise data content-related constraints. The example process of FIG. 19 may be re-used by modifying step 5. In particular, when the CDS receives the discovery request and checks its local inventory for WoT-compliant things/devices that satisfy SL-NC-1's request, the CDS may also retrieve the most up-to-date data from original WoT things in order to evaluate data content related constraints.

Figure 20:
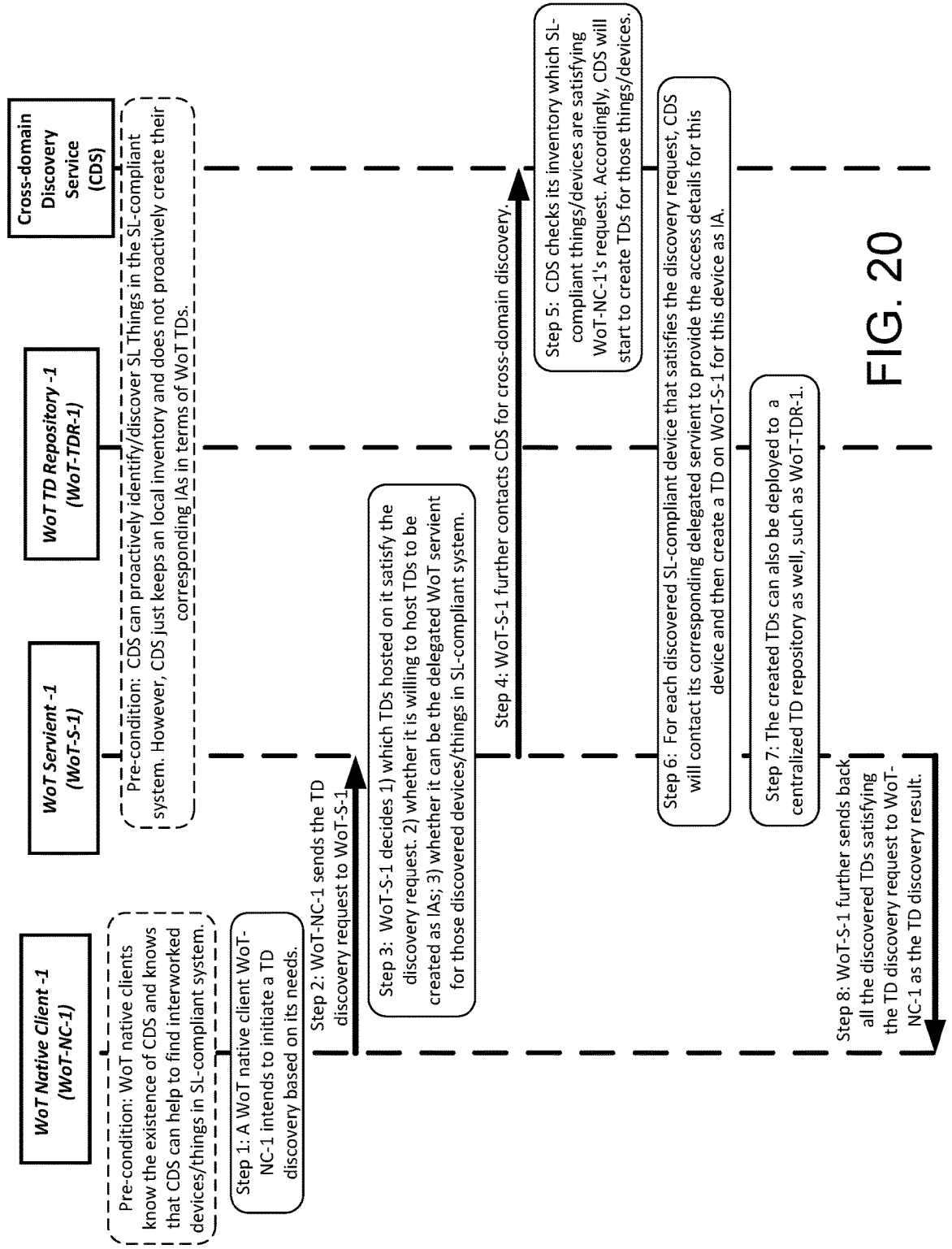
FIG. 20 illustrates another example process for cross-domain discovery for WoT-NCs to discover things in an SL-compliant system.

FIG. 20 illustrates an example process for cross-domain discovery for the direction that WoT-NCs may discover things in an SL-compliant system.

The process of FIG. 20 begins with a pre-condition that a CDS may proactively identify/discover SL Things in the SL-compliant system. However, the CDS may keep a local inventory and may not proactively create corresponding IAs as WoT TDs. Such IAs may be dynamically created based on WoT native clients' discovery requests. Instead, WoT native clients may utilize the CDS to assist in finding devices/things in the SL-compliant system.

At step 1, a WoT native client WoT-NC-1 may initiate a TD discovery based on its needs. For example, a discovery request may be to find all cameras on Road-1 regardless of whether they are SL-compliant cameras or WoT-compliant cameras. WoT-NC-1 may indicate several preferences in the discovery request: (1) whether WoT-NC-1 wants to utilize the cross-domain discovery capability of the CDS; (2) which servient should host the created TDs as IAs; and (3) which servients are the preferred delegated servients for receiving future access requests from WoT native clients.

At step 2, WoT-NC-1 may send the TD discovery request to WoT-S-1. Accordingly, if WoT-NC-1 is sending the request to a TD host such as WoT-S-1, it is assumed that WoT-NC-1 prefers WoT-S-1 as the desired TD host for the IAs to be created. The request may comprise the following new parameters: Cross-domain_Discovery_Indicator (cdi); Action (act); and Desired_Delegated_Servient (dds).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The act parameter may indicate an action the CDS is expected to take. For example, the action may be to conduct cross-domain discovery. The CDS may also make a decision based on its local policy in order to decide whether the required action is permitted for this request.

The dds parameter may indicate, for the discovered SL-compliant devices, which servient (e.g., WoT-S-1 in FIG. 20) is the desired delegated servient for receiving future access requests from WoT native clients.

Alternatively, the WoT-NC-1 may also directly send its discovery request to the CDS to trigger a cross-domain discovery. In such embodiments, steps 3-4 may be skipped. The request may comprise the following new parameters: Cross-domain_Discovery_Indicator (cdi); Desired_TD_Host (dth); and Desired_Delegated_Servient (dds).

The cdi parameter may indicate whether the client requires cross-domain discovery.

The dth parameter may indicate which servient is the desired TD Host that the IAs (in terms of TDs) should be created on, e.g., WoT-S-1 in FIG. 20. For example, the CDS may be responsible for checking with the desired servient whether the servient allows IAs to be created on it, e.g., WoT-S-1 in FIG. 20. Generally, this parameter may include a list of servients.

The dds parameter may indicate, for the discovered SL-compliant devices, which servient (e.g., WoT-S-1 in FIG. 20) is the desired delegated servient for receiving future access requests from WoT native clients. Generally, this parameter may also include a list of servients.

At step 3, WoT-S-1 may receive the discovery request from WoT-NC-1 and determine which TDs, if any, satisfy WoT-NC-1's request. In addition, WoT-S-1 may also decide (1) whether it is willing to host TDs to be created, which are IAs of the discovered devices/things in the SL-compliant system that satisfy the TD discovery request and (2) whether WoT-S-1 may be the delegated WoT servient for those discovered devices/things in the SL-compliant system if the value of the dth parameter is WoT-S-1. If the value of the dth parameter comprises other servients, WoT-S-1 may need to further negotiate/check with those servients.

It should be appreciated that even if WoT-NC-1 did not indicate in step 2 that cross-domain discovery is needed, WoT-S-1 may initiate cross-domain discovery by itself.

At step 4, WoT-S-1 may create a new discovery request that may be processed by the CDS and may send the discovery request to the CDS. WoT-S-1 may also indicate (1) that WoT-S-1 is willing to host TDs to be created and (2) which servient is the preferred delegated WoT servients for those discovered devices/things in the SL-compliant system. The request may comprise the following new parameters: Action (act); Selected_TD_Host (sth); and Selected_Delegated_Serivents (sds).

The act parameter may indicate an action the CDS is expected to take. For example, the action may be to conduct cross-domain discovery. The CDS may also make a decision based on its local policy in order to decide whether the required action is permitted for this request.

The sth parameter may indicate which servient is the TD Host that the IAs (in terms of TDs) should be created on, e.g., WoT-S-1 in FIG. 20.

The sds parameter may indicate, for the discovered SL-compliant devices, which servient (e.g., WoT-S-1 in FIG. 20) is the desired delegated servient for receiving future access requests from WoT native clients. Generally, this parameter may include a list of servients.

At step 5, the CDS may receive the discovery request and may check its local inventory for SL-compliant things/devices that satisfy WoT-NC-1's request. Accordingly, the CDS may create TDs for those discovered things/devices on WoT-S-1 if they do not already exist.

At step 6, for each discovered SL-compliant device that satisfies the discovery request, the CDS may contact its corresponding delegated servient (e.g., WoT-S-1 in FIG. 20) to provide access details (e.g., Base URIs and other access details) for the device. Accordingly, the CDS may create a TD as an IA for the device, in which the access details may be included. The created TDs may be deployed to WoT-S-1. This step may be repeated for each discovered SL-compliant device that does not already have a TD.

At step 7, the created TDs may also be deployed to a centralized TD repository, such as WoT-TDR-1. This step may be repeated for each created TD.

At step 8, WoT-S-1 may send back the discovered TDs satisfying the TD discovery request to WoT-NC-1 as the TD discovery result.

As described above in Use Case 2, clients' discovery requests may comprise data content-related constraints. The example process of FIG. 20 may be re-used by modifying step 5. In particular, when the CDS receives the discovery request and checks its local inventory for SL-compliant things/devices satisfies WoT-NC-1's request, the CDS may also retrieve the most up-to-date data from original SL-compliant things in order to evaluate data content related constraints.

Example embodiments may perform cross-domain discovery and IA creation and synchronization based on a reactive cross-domain discovery and reactive interworking avatar creation scheme.

As described above, a CDS may proactively conduct cross-domain discovery in a system and store the results in a local inventory. However, the CDS may reactively perform IA creation, triggered by discovery requests from SL/WoT clients. It should be appreciated that there is a certain amount of overhead for performing proactive cross-domain discovery. In example embodiments, the overhead may be wasteful. Accordingly, the CDS may perform in a fully reactive manner, meaning the CDS may reactively perform cross-domain discovery and reactively perform IA creation. In this manner, the CDS may perform in an on-demand fashion.

It should be appreciated that the example processes described above with respect to FIG. 19 and FIG. 20 may be re-used by adapting one step related to the processing at the CDS. In particular, when the CDS receives the discovery requests from clients in a system, the CDS may dynamically initiate a discovery operation in another system in addition to checking its local inventory. A difference from the above example processes is that the CDS may not conduct proactive cross-domain discovery in order to fill its local inventory. As such, the items cached/stored in the local inventory of the CDS may be previous discovery results found by the CDS, which were reactively triggered by discovery requests from SL/WoT clients.

Example embodiments may perform cross-domain discovery but not create thing-specific IAs.

A client may initiate discovery by specifying its needs as discovery constraints and may plan to initiate a group-based operation on the discovered devices. For example, a client may wish to submit a discovery request such as "find me all the cameras on Road-1". After the discovery result is returned to the client, the client may subsequently conduct a group-based RETRIEVE operation to collect the latest images from the discovered cameras included in the discovered result. The client may not wish to interact with a specific discovered device. Instead, the client may intend to conduct one or more group-based operations over the whole group of discovered devices. It should be appreciated that there is certain amount of overhead for creating an IA for each discovered device. Therefore, in order to further reduce the IA creation overhead, the following example embodiments do not create an IA for each discovered thing/device, and a single IA may be created for the whole group of discovered devices for supporting the group operation to be conducted by the client. It should be appreciated that the ideas shown here may be applied to any system as long as it has similar group-like operations as supported in an SL-compliant system.

Figure 21:
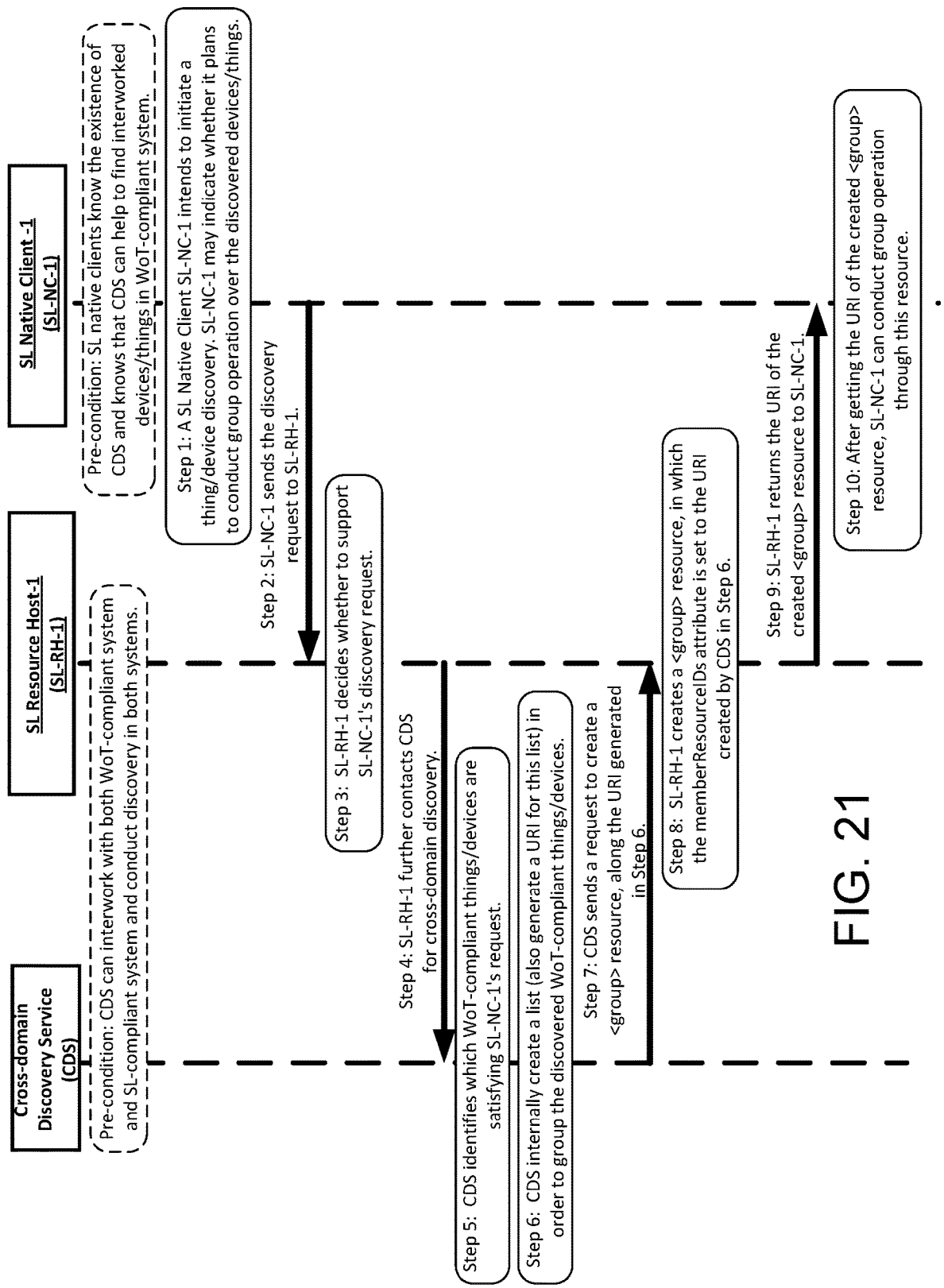
FIG. 21 illustrates another example process for cross-domain discovery for SL-NCs to discover things in WoT-compliant systems.

FIG. 21 illustrates an example process for cross-domain discovery for the direction that SL-NCs may discover things in WoT-compliant system. In particular, the example process is designed to support the application scenario of Use Case 1. Details to adopt/extend the example process to Use Case 2 are also described below.

The process of FIG. 21 begins with a pre-condition that a CDS may interwork with both WoT-compliant system and SL-compliant system and conduct discovery in both systems. SL native clients know the existence of CDS and knows that CDS may help to find interworked devices/things in WoT-compliant system.

At step 1, an SL Native Client SL-NC-1 (e.g., an SL-compliant device) may initiate a thing/device discovery based on its needs. For example, a discovery request may be to find all cameras on Road-1 regardless of whether they are SL-compliant cameras or WoT-compliant cameras. Additionally, SL-NC-1 may indicate whether it plans to conduct one or more group operations over the discovered devices/things. Accordingly, if SL-NC-1 is sending the request to a resource host such as SL-RH-1, it may be assumed that SL-NC-1 prefers SL-RH-1 as the desired resource host for the IA to be created for supporting the one or more group operations.

At step 2, SL-NC-1 may send the discovery request to SL-RH-1. The request may comprise the following new parameters: Cross-domain_Discovery_Indicator (cdi); Group_Operation_Indicator (goi); and Group_Related_Information (gri).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The goi parameter may indicate whether a group operation is planned to be conducted over the discovered devices/things.

The gri parameter may be an optional parameter and may indicate additional information about the group, such as group name, group ID, and other group-related information.

Alternatively, the SL-NC-1 may directly send its discovery request to the CDS to trigger a cross-domain discovery. In such embodiments, steps 3-4 may be skipped. The request may comprise the following new parameters: Cross-domain_ Discovery_Indicator (cdi); Group_Operation_Indicator (goi); Desired_Resource_Host (drh); and Group_Related_Information (gri).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The drh parameter may indicate which resource host is the desired RH that IAs should be created on. For example, the CDS may be responsible for checking with the desired resource host whether the RH allows IAs to be created on it, e.g., SL-RH-1 in FIG. 21. The CDS may be responsible for checking with the RH whether the RH allows creation of IAs.

The goi parameter may indicate whether a group operation is planned to be conducted over the discovered devices/things.

The gri parameter may be an optional parameter and may indicate additional information about the group, such as group name, group ID, and other group-related information.

At step 3, SL-RH-1 may receive the discovery request from SL-NC-1 and may decide whether to support SL-NC-1's discovery request.

At step 4, SL-RH-1 may create a new discovery request that may be processed by the CDS and may send the discovery request to the CDS. The request may comprise the following new parameters: Group_Operation_Indicator (goi); and selected_Resource_Host (srh).

The goi parameter may indicate whether a group operation is planned to be conducted over the discovered devices/things.

The srh parameter may indicate which resource host is the selected RH that the group IA should be created on, e.g., SL-RH-1 in FIG. 21.

At step 5, the CDS may determine which WoT-compliant things/devices satisfy SL-NC-1's request. The CDS may proactively identify/discover WoT Things in the WoT-compliant system or reactively identify WoT Things in the WoT-compliant system, as triggered by SL clients' discovery requests.

At step 6, the CDS may create a list of the WoT-compliant things/devices discovered in step 5, and may generate a URI for the list, in order to group the discovered WoT-compliant things/devices.

At step 7, the CDS may send a request to SL-RH-1 to create a <group> resource, which may be used by SL-NC-1 for conducting one or more future group operations on those discovered devices/things. The request message may comprise the URI generated in step 6, and may also comprise the following new parameter: Internal_Group_URI (igu).

The igu parameter may describe the URI generated by the CDS that corresponds to the list of discovered devices, as described in step 6.

At step 8, SL-RH-1 may create a <group> resource in which the memberResourceIDs attribute may be set to the URI created by the CDS in step 6, i.e., the URI described by the igu parameter. There may be no interworking avatars created on SL-RH-1 for each individual discovered device.

At step 9, after the <group> resource is created, SL-RH-1 may returns the URI of the <group> resource to SL-NC-1.

At step 10, with the URI of the <group> resource, SL-NC-1 may conduct one or more group operations by directly sending its command to the <fanOutPoint> virtual child resource of the <group> resource. For example, a command may be to retrieve images from the WoT-compliant cameras on Road-1.

As described above in Use Case 2, clients' discovery requests may comprise data content-related constraints. The example process of FIG. 21 may be re-used by modifying steps 5-6. In particular, when the CDS receives the discovery request and checks which WoT-compliant things/devices satisfy SL-NC-1's request, the CDS may also retrieve the most up-to-date data from original WoT things in order to evaluate data content related constraints. Because the data of discovered devices may change over time, the CDS may also make dynamic updates for the members of the list internally created by the CDS in step 6.

Figure 22:
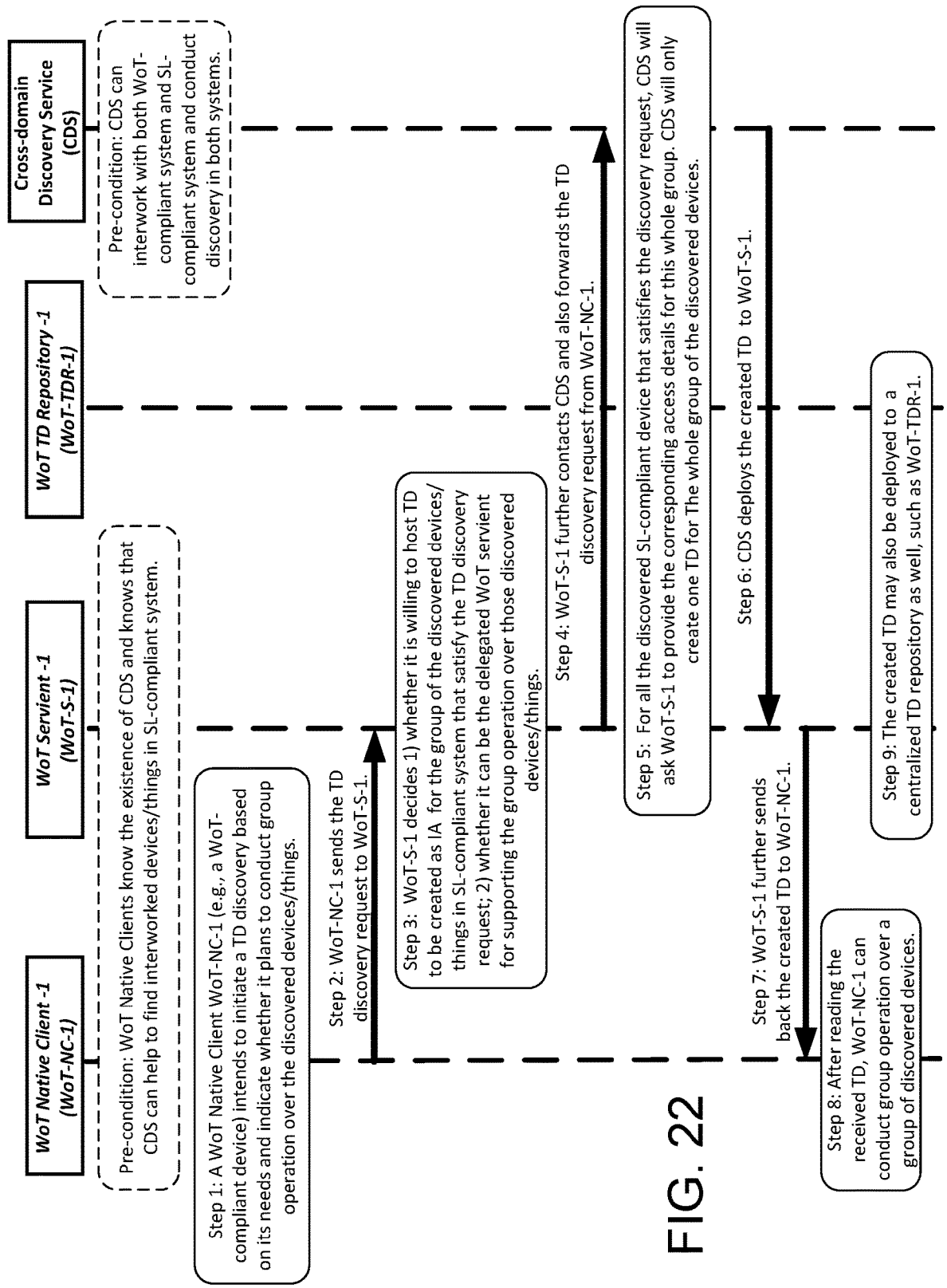
FIG. 22 illustrates another example process for cross-domain discovery for WoT-NCs to discover things in an SL-compliant system.

FIG. 22 illustrates an example process for cross-domain discovery for the direction that WoT-NCs may discover things in an SL-compliant system.

The process of FIG. 22 begins with a pre-condition that WoT Native Clients may utilize the CDS to find interworked devices/things in an SL-compliant system. The CDS may interwork with both a WoT-compliant system and the SL-compliant system and conduct discovery in both systems.

At step 1, a WoT Native Client WoT-NC-1 (e.g., a WoT-compliant device) may initiate a TD discovery based on its needs. For example, a discovery request may be to find all cameras on Road-1 regardless of whether they are SL-compliant cameras or WoT-compliant cameras. WoT-NC-1 may indicate whether it plans to conduct group operation over the discovered devices/things and may also indicate several preferences in the discovery request: (1) whether WoT-NC-1 wants to utilize the cross-domain discovery capability of the CDS; (2) which servient should host the created TD as an IA; and (3) which servient is the preferred delegated servient for receiving one or more group-operation requests from WoT native clients.

At step 2, WoT-NC-1 may send the TD discovery request to WoT-S-1. Accordingly, if WoT-NC-1 is sending the request to a servient such as WoT-S-1, it is assumed that WoT-NC-1 prefers WoT-S-1 as the desired TD host for the IA to be created. The request may comprise the following new parameters: Cross-domain_Discovery_Indicator (cdi); Group_Operation_Indicator (goi); Group_Related_Information (gri); and Desired_Delegated_Servient_For_Group (ddsfg).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The goi parameter may indicate whether a group operation is planned to be conducted over the discovered devices/things.

The gri parameter may be an optional parameter and may indicate additional information about the group, such as group name, group ID, and other group-related information.

The ddsfg parameter may indicate, for the group of discovered SL-compliant devices, which servient (e.g., WoT-S-1 in FIG. 22) is the desired delegated servient for receiving one or more group-operation requests from WoT native clients.

Alternatively, WoT-NC-1 may also directly send its discovery request to the CDS to trigger a cross-domain discovery for supporting future group operations. In such embodiments, steps 3-4 may be skipped. The request may comprise the following new parameters: Cross-domain_Discovery_Indicator (cdi); Group_Operation_Indicator (goi); Group_Related_Information (gri); Desired_TD_Host_For_Group (dthfg); and Desired_Delegated_Servient_For_Group (ddsfg).

The cdi parameter may indicate whether the client requires cross-domain discovery. If cdi=True, IAs may be included in the discovery result if they satisfy the discovery request. Otherwise (i.e., cdi=False), IAs may not be included in the discovery result. If the cdi parameter is not present in the request (e.g., when interworking is fully transparent to the clients), the default decision is that a cross-domain discovery should be performed because IAs typically may be understood and accessed by clients. Alternatively, the CDS may make a decision based on its local policy in order to decide whether to conduct cross-domain discovery for serving this request.

The goi parameter may indicate whether a group operation is planned to be conducted over the discovered devices/things.

The gri parameter may be an optional parameter and may indicate additional information about the group, such as group name, group ID, and other group-related information.

The dthfg parameter may indicate which servient is the desired TD Host that the IA (in terms of the TD for the whole group of discovered device) should be created on, e.g., WoT-S-1 in FIG. 22.

The ddsfg parameter may indicate, for the group of discovered SL-compliant devices, which servient (e.g., WoT-S-1 in FIG. 22) is the desired delegated servient for receiving one or more group-operation requests from WoT native clients.

At step 3, WoT-S-1 may receive the TD discovery request from WoT-NC-1. WoT-S-1 may decide (1) whether it is willing to host the TD to be created as IA for the group of the discovered devices/things in the SL-compliant system that satisfy the TD discovery request and (2) whether WoT-S-1 may be the delegated WoT servient for supporting the group operation over those discovered devices/things if the value of the ddsfg parameter is WoT-S-1. If the value of the ddsfg parameter comprises other servients, WoT-S-1 may need to further negotiate/check with those servients.

At step 4, WoT-S-1 may create a new discovery request that may be processed by the CDS and may send the discovery request to the CDS. The request may comprise the following new parameters: Group_Operation_Indicator (goi); Selected_TD_Host_For_Group (sthfg); and Selected_Delegated_Servient_For_Group (sdsfg).

The goi parameter may indicate whether a group operation is planned to be conducted over the discovered devices/things.

The sthfg parameter may indicate which servient is the TD Host that the IA should be created on, e.g., WoT-S-1 in FIG. 22.

The sdsfg parameter may indicate, for the group of discovered SL-compliant devices, which servient (e.g., WoT-S-1 in FIG. 22) is the selected delegated servient for receiving group-operation requests from WoT native clients.

At step 5, the CDS may determine which SL-compliant things/devices satisfy WoT-NC-1's request through resource discovery in the SL-compliant system. The CDS may proactively identify/discover SL Things in the SL-compliant system or reactively identify SL Things in the SL-compliant system, as triggered by WoT clients' discovery requests. For the group of discovered SL-compliant devices that satisfy the discovery request, the CDS may generate a list for recording the group and request WoT-S-1 provide corresponding access details (e.g., URIs and other access details) to be used for triggering future operations over the group. The CDS may create one TD for the group of the discovered devices, in which access details are provided. For example, the existing "Association" key word, as defined in TD, may be enhanced for supporting the operation defined in this step as follows. In the created TD, the Base URI, which may be used to trigger group operations, may refer to the group while the Association section may include a list of member devices of the group. Such a list may comprise a number of device IDs or URIs that may be recognized by the CDS.

At step 6, the CDS may deploy the created TD to the selected TD host as determined in step 4. In the example process of FIG. 22, WoT-S-1 may host the created TD.

At step 7, WoT-S-1 may send back the created TD to WoT-NC-1, wherein the TD describes a group of discovered devices and the access details for future group operations over the group.

At step 8, after reading the received TD, WoT-NC-1 may conduct one or more group operations over the group of discovered devices.

At step 9, in addition to being deployed to a TD host, the created TD may also be deployed to a centralized TD repository, such as WoT-TDR-1. Steps 1-8 of this example process may also be used in such TDR embodiments.

As described above in Use Case 2, clients' discovery requests may comprise data content-related constraints. The example process of FIG. 22 may be re-used by modifying step 5. In particular, when the CDS receives the discovery request and checks which SL-compliant things/devices satisfy WoT-NC-1's request, the CDS may also retrieve the most up-to-date data from original SL things in order to evaluate data content related constraints. Because the data of discovered devices may change over time, the CDS may also periodically check the readings of the member devices in the list. If the reading of a member device no longer meets the data-content related constraint, the device may be deleted from the list internally created by the CDS in step 5.

Embodiments described herein enable a CDS between two disparate systems and at least four working modes of the CDS: Proactive Cross-domain Discovery and Proactive IA Creation (P-P); Proactive Cross-domain Discovery and Reactive IA Creation (P-R); Reactive Cross-domain Discovery and Reactive IA Creation (R-R); and No Thing-Specific IA Creation for Discovered Things (Group). A CDS should be able to support the working modes described herein and may be able to switch between the working modes depending on various conditions. The following example embodiments describe a CDS that may adapt to varying system states and may limit overhead in so adapting.

After initial setting up of the CDS architecture, the two interworked systems may be connected and there may be no IAs created and no discovery requests initiated by clients. At this stage, the CDS may use the P-P working mode.

Alternatively, if the CDS should operate in a more cost-efficient or energy-efficient way, the CDS may choose P-R or R-R when the system is initially set up. Generally, the CDS may broadcast its current working mode to its potential clients.

If the R-R working mode was selected, after some time the CDS may have conducted many reactive cross-domain discoveries triggered by discovery requests from clients. The local inventory of the CDS may have cached sufficient discovery results. At this stage, the working mode of the CDS may switch from R-R to P-R because its local inventory has enough information that may be valid for a period of time. At a later time, if the local inventory of the CDS is going to be out-of-date in the sense that P-R is no longer optimal, the working mode of the CDS may switch back to R-R.

Similarly, if R-R or P-R was selected after the system was initially set up (i.e., P-P was not used), the IA creation process defined in the P-R and R-R working modes may also create many IAs. After some time, if the CDS determines that there are sufficient IAs that have already been created and may be valid for a period of time, the CDS may not proceed with P-R or R-R working modes. In order to do so, the CDS may decline newly-received discovery requests as defined with respect to the P-R and R-R working modes, as described herein, and may indicate that the existing IAs are up-to-date and sufficient. The CDS may also indicate its current working mode to the clients such that the clients may understand the working status of the CDS and determine how to interact with the CDS for future discovery requests. By doing so, the working model of the CDS may be switched from P-R or R-R to P-P.

Additionally, for the Group working mode, if <group> resources have been created during previous discovery requests for supporting one or more group operations as defined in with respect to the Group working mode as described herein, those <group> resources may be re-used as long as they may satisfy later discovery requests that have similar group operation needs.

Figure 23:
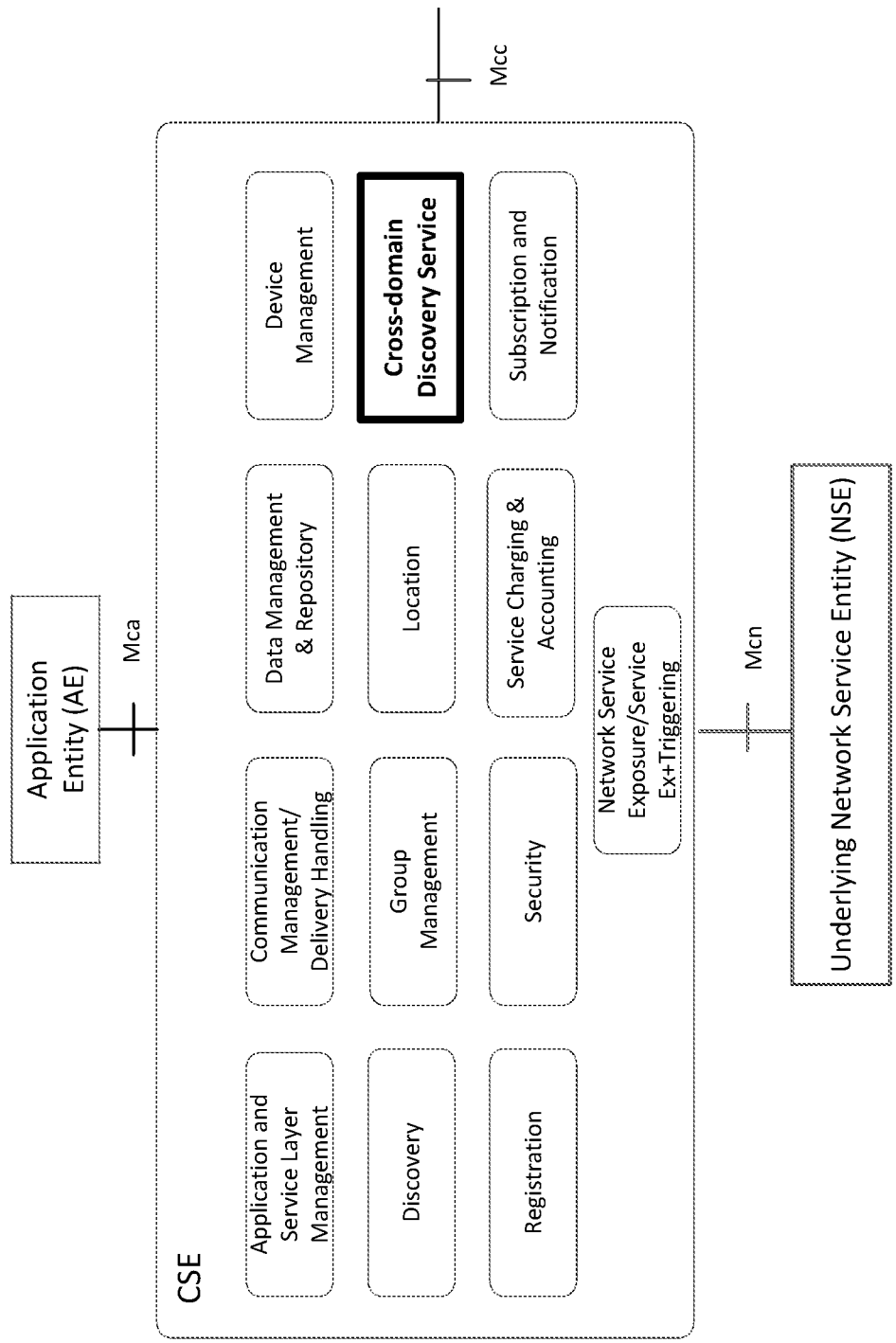
FIG. 23 illustrates example CSFs in a oneM2M service layer.

Example oneM2M Embodiment oneM2M is currently in the process of defining capabilities supported by the oneM2M service layer. These capabilities are referred to as Capability Service Functions (CSFs). The oneM2M service layer is referred to as a Capability Services Entity (CSE). Accordingly, the CDS, as described herein, may be implemented as a new CSF in the service layer, as shown in FIG. 23.

Alternatively, the CDS may also be implemented part of the existing DIS CSF as defined by oneM2M. It should be understood that different types of M2M nodes may implement interworking services, such as M2M Gateways, M2M Servers, M2M Devices, etc. In particular, depending on the various/different hardware/software capacities for such nodes, the capacities of interworking services implemented by those nodes may also vary.

Alternatively, the CDS may be implemented by an AE. For example, the existing IPE as defined by oneM2M may also realize functionalities of the CDS.

Figure 24:
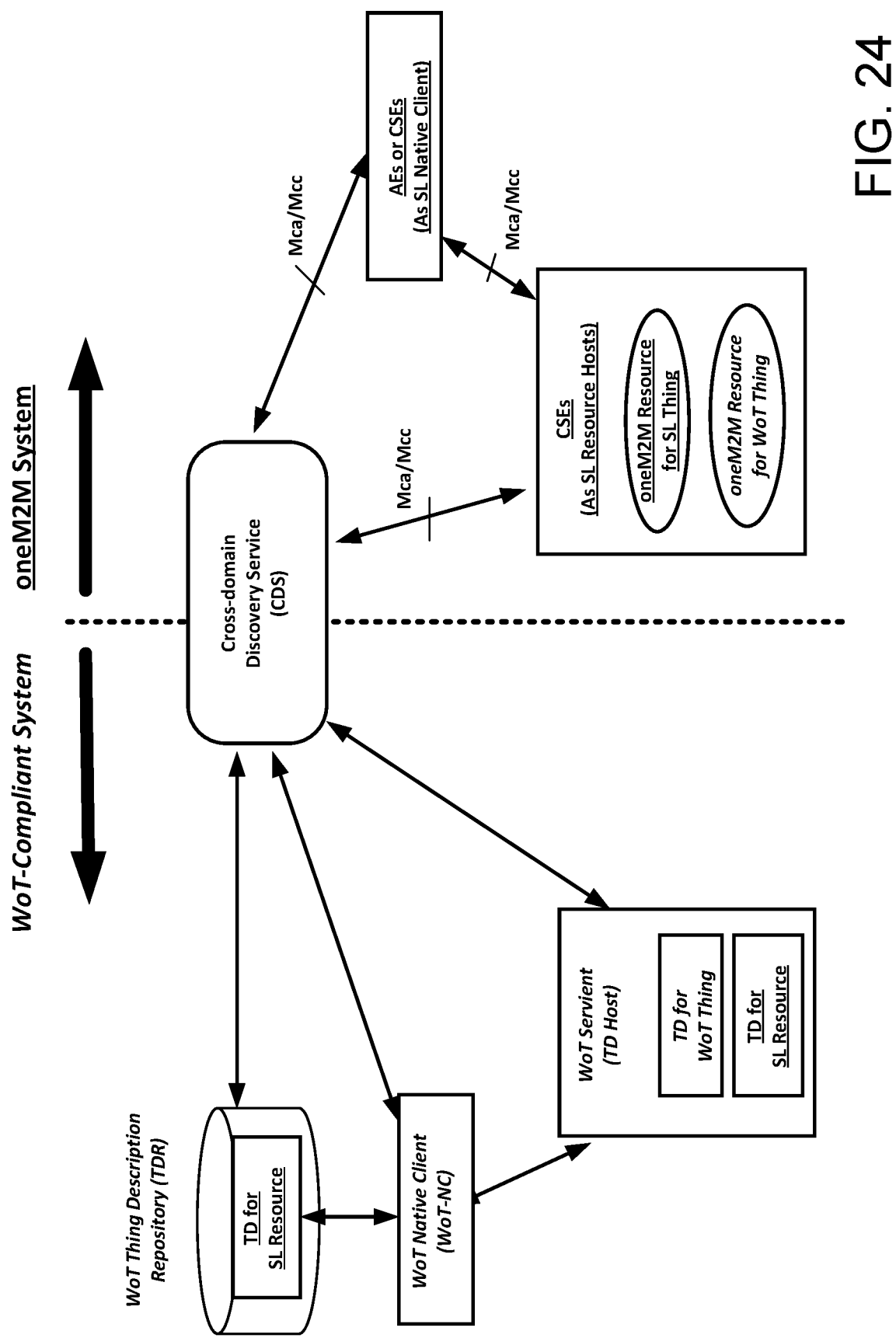
FIG. 24 illustrates an example oneM2M embodiment of a CDS architecture.

Several entities have been defined for use with a CDS. FIG. 24 illustrates how such entities may be embodied in a oneM2M context. For example, an SL Resource Host may be a CSE in the oneM2M system and an AE/CSE may be an SL Native Client. In such example embodiments, an AE or a CSE may have the CDS capability. In addition, IAs in the WoT-compliant System mainly refer to TDs, while in the oneM2M System, IAs mainly refer to oneM2M resources.

From an implementation perspective, the CDS may be implemented by two components, i.e., one component that is deployed in an SL-compliant system (which may handle processing happening in the SL-compliant system) and another component that is deployed in a WoT-compliant system (which may handle processing happening in the WoT-compliant system). Interaction and cooperation between such components may realize a CDS.

Example New Resource Types

Figure 25:
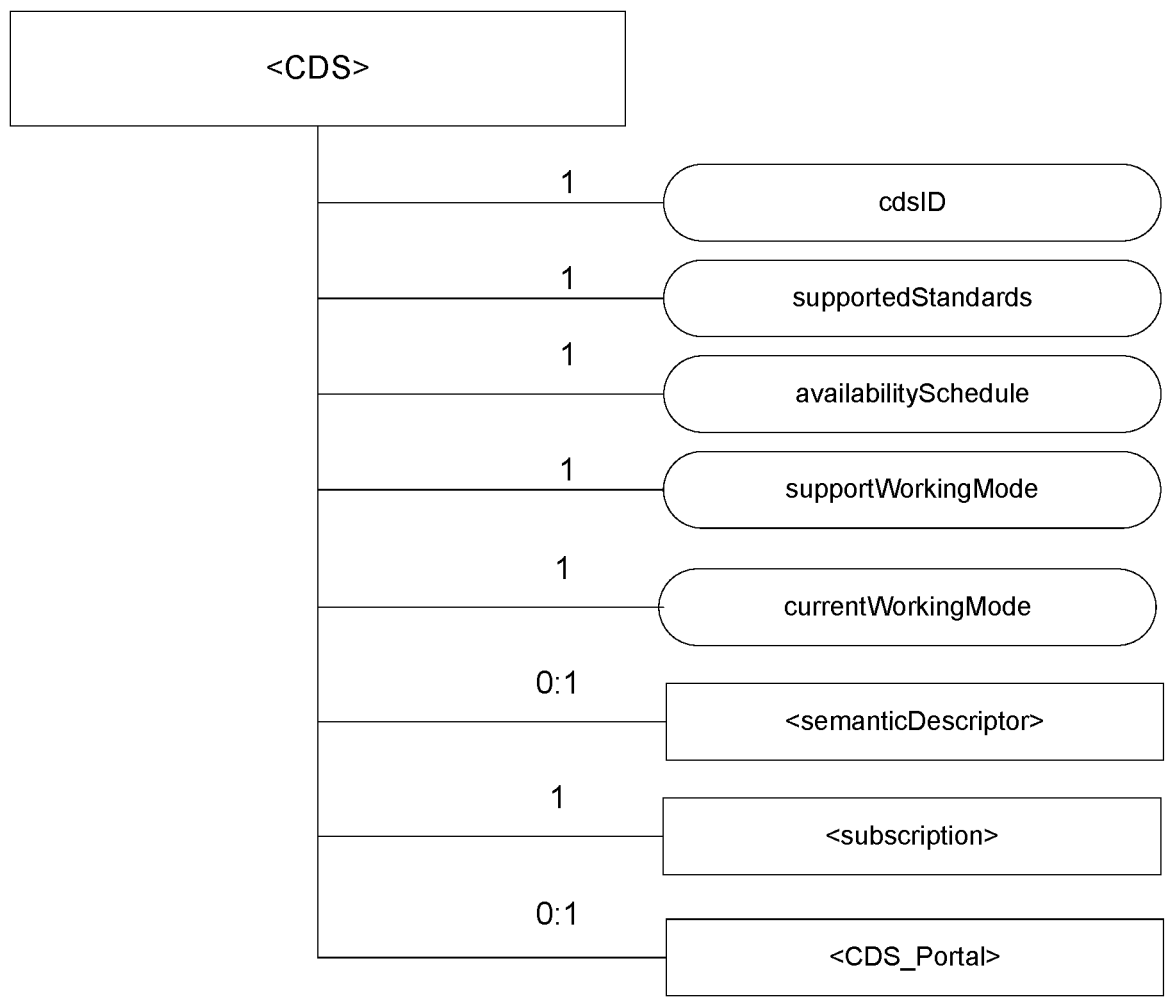
FIG. 25 illustrates an example structure of a <CDS> resource.

A new resource called <CDS> is introduced in FIG. 25. The structure of the <CDS> resource is illustrated in FIG. 25. Such a resource may receive cross-domain discovery requests. The <CDS> resource may also comprise common attributes for service layer resources, which are not shown in FIG. 25.

The <CDS> resource may represent an available cross-domain discovery service. If a CSE has the CDS capability, the CSE may create a <CDS> resource (e.g., under <CSE-Base>) for supporting cross-domain discovery features. Alternatively, if an AE has the CDS capability, the AE may create a <CDS> resource on its register CSE (e.g., under its registered <AE> resource) for supporting cross-domain discovery features.

A <CDS> resource may comprise the child resources specified in Table 1 and shown in FIG. 25.

TABLE 1

Child resources of <CDS> resource

| Child Resources of <CDS> | Child Resource Type | Multiplicity | Description |
|---|---|---|---|
| <variable> | <semanticDescriptor> | 0 . . . 1 | Describes general semantic information about this <CDS> resource, which should leverage appropriate ontologies to describe the functionality of CDS. |
| <variable> | <subscription> | 0 . . . n | Stands for any subscription on this <CDS>. |
| <CDS_Portal> | <CDS_Portal> | 0 . . . 1 | This is a standard oneM2M virtual resource. When a client of CDS sends a RETRIEVE operation on this virtual resource, it triggers a cross-domain discovery operation. |

A <CDS> resource may comprise the attributes specified in Table 2 and shown in FIG. 25.

TABLE 2

Attribute of <CDS> resource

| Attributes of <CDS> | Multiplicity | RW/ RO/ WO | Description |
|---|---|---|---|
| cdsID | 1 | RW | Denotes the identifier (e.g. URI) of a CDS service instance. |
| supportedStandards | 1 | RW | In general, a single <CDS> may be used for cross-domain discovery between a specific pair of interworked systems as indicated by this parameter. For example, if this parameter has values in terms of "WoT and oneM2M", the WoT/SL native clients may know that this CDS may conduct discovery in both a WoT-compliant system and a oneM2M system. |
| availabilitySchedule | 1 | RW | Indicates the availability schedule of this CDS service if this service is not always available for supporting cross-domain discovery. |
| supportedWorkingMode | 1 | RO | The parameter indicates the working mode that this CDS may support: P-P; P-R; R-R; and Group. If a CDS may support multiple working modes, this parameter should indicate this information. It should be appreciated that this parameter may only be modified/updated by the provider of this CDS. |
| currentWorkingMode | 1 | RO | CDS may operate in different working modes in different stages. The parameter indicates the current working mode that this CDS is operating in. This information may be retrieved by CDS clients. |

Alternatively, a CDS may be exposed using existing <CSEBase> or <remoteCSE> resources. Accordingly, the attributes shown in Table 2 may be new attributes for the <CSEBase> or <remoteCSE> resources. There may be multiple ways for a <CSEBase> resource to receive CDS-related requests. In an example embodiment, a <CDS_Portal> resource may be a new child resource of the <CSEBase> or <remoteCSE> resource for receiving requests related to cross-domain discovery operations as described herein. In another example embodiment, instead of defining a new resource, the discovery requests from clients may directly be sent towards <CSEBase>, in which a trigger may be defined in the request message. For example, a new filter usage of filterCriteria may be defined with a value of "cross_domain_discovery".

Accordingly, different request-response patterns may be supported because a cross-discovery operation by a CDS may take a certain amount of time. For example, when sending a discovery request to a CDS (either through a <CDS> resource or through a <CSEBase> resource exposing CDS capability), at least the following types of request-response patterns may be supported.

A synchronized request-response pattern may be supported. With such a pattern, a client may wait for the processing of the CDS until the CDS returns a cross-domain discovery result.

A Non-Block Synchronized request-response pattern may be supported. With such a pattern, the CDS may send an ack to a client and create a <request> resource. At a later time, the client may choose to retrieve the discovery result from this <request> resource. If the <CDS_Portal> resource is the child resource of the <CSEBase> resource, the To parameter of the <request> resource should have a URI of the <CDS_Portal> resource. In case the client utilizes the filter usage parameter having a value of "cross_domain_discovery" in the request message towards the <CSEBase> resource, the To parameter of the <request> resource should have a URI of the <CDSBase> resource.

A Non-Block Asynchronized request-response pattern may be supported. With such a pattern, the CDS may send an ack to a client. At a later time, the client may be notified of the discovery result from the CDS.

Figure 26:
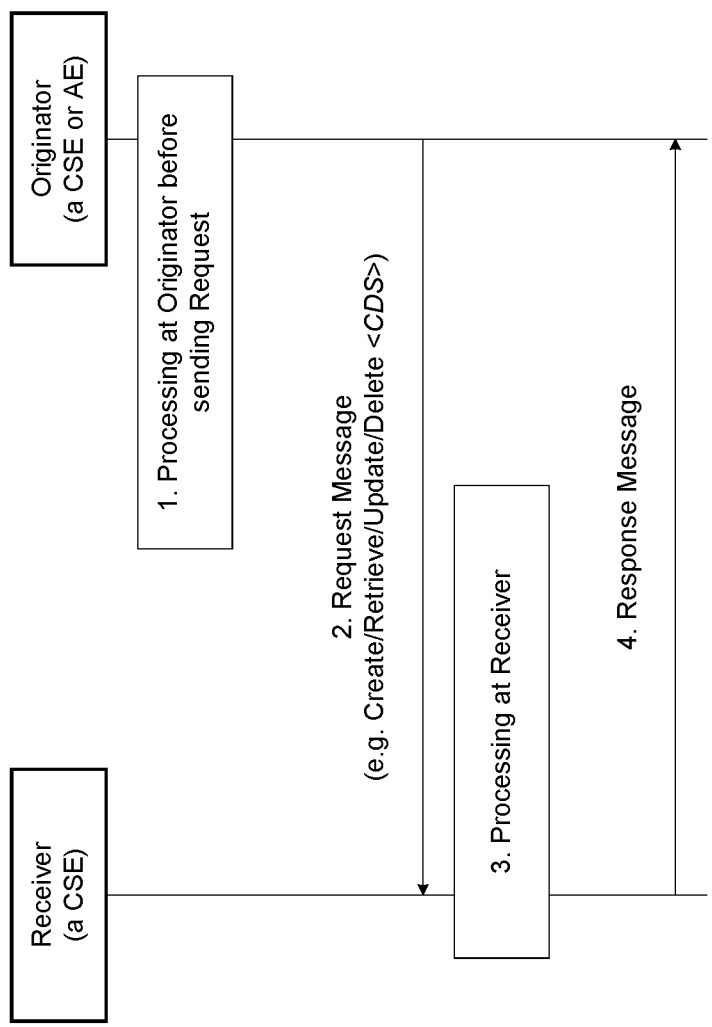
FIG. 26 illustrates an example process to operate a <CDS> resource.

FIG. 26 illustrates an example process to operate a <CDS> resource. For example CRUD operations (i.e., Create/Retrieve/Update/Delete) may be performed on a <CDS> resource.

As used herein, the term "oneM2M Functional Architecture" may refer to *OneM2M Functional Architecture Specification* TS-0001, v3.8.0, October 2017.

The example process described in Table 3 may be used for creating a <CDS> resource.

TABLE 3

| <CDS> CREATE | |
| --- | --- |
| Associated Reference Point | Mca, Mcc and Mcc'. |
| Information in Request message | Parameters defined in "WoT Current Practices" apply with specific details for:<br>Content: The resource content may provide information about a <CDS> resource (e.g., attribute values) as described herein. |
| Processing at Originator before sending Request | According to "oneM2M Functional Architecture" |
| Processing at Receiver | According to "oneM2M Functional Architecture" |
| Information in Response message | Parameters defined in "WoT Current Practices" apply with specific details for:<br>Content: Address of the created <CDS> resource, according to the WoT standard. |
| Processing at Originator after receiving Response | According to "oneM2M Functional Architecture" |
| Exceptions | According to "oneM2M Functional Architecture" |

The example process described in Table 4 may be used for retrieving the attributes of a <CDS> resource.

TABLE 4

| <CDS> RETRIEVE | |
| --- | --- |
| Associated Reference Point | Mca, Mcc and Mcc'. |
| Information in Request message | Parameters defined in "WoT Current Practices" apply with specific details for:<br>Content: void. |
| Processing at Originator before sending Request | According to "oneM2M Functional Architecture" |
| Processing at Receiver | The Receiver shall verify the existence of the target resource or the attribute and check if the Originator has appropriate privileges to retrieve information stored in the resource/attribute. Otherwise "WoT Current Practices" apply. |
| Information in Response message | Parameters defined in "WoT Current Practices" apply with specific details for:<br>Content: attributes of the <CDS> resource as defined as described above. |
| Processing at Originator after receiving Response | According to "oneM2M Functional Architecture" |
| Exceptions | According to "oneM2M Functional Architecture" |

The example process described in Table 5 may be used to update an existing <CDS>, e.g., an update to its working-Mode attribute.

TABLE 5

| <CDS> UPDATE | |
| --- | --- |
| Associated Reference Point | Mca, Mcc and Mcc'. |
| Information in Request message | Parameters defined in "WoT Current Practices" apply with specific details for:<br>Content: attributes of the <CDS> resource as described above. |
| Processing at Originator before sending Request | According to "oneM2M Functional Architecture" |
| Processing at Receiver | According to "oneM2M Functional Architecture" |
| Information in Response message | According to "oneM2M Functional Architecture" |

TABLE 5-continued

| <CDS> UPDATE | |
|---|---|
| Processing at Originator after receiving Response | According to "oneM2M Functional Architecture" |
| Exceptions | According to "oneM2M Functional Architecture" |

The example process described in Table 6 may be used to delete an existing <CDS>.

TABLE 6

| <CDS> DELETE | |
|---|---|
| Associated Reference Point | Mca, Mcc and Mcc'. |
| Information in Request message | Parameters defined in "WoT Current Practices" apply. |
| Processing at Originator before sending Request | According to "oneM2M Functional Architecture" |
| Processing at Receiver | According to "oneM2M Functional Architecture" |
| Information in Response message | According to "oneM2M Functional Architecture" |
| Processing at Originator after receiving Response | According to "oneM2M Functional Architecture" |
| Exceptions | According to "oneM2M Functional Architecture" |

A new resource <CDS_Portal> may be introduced. The <CDS_Portal> resource may be a virtual resource because it may not have a representation. The <CDS_Portal> resource may be a child resource of a <CDS> resource. When a RETRIEVE operation is sent to the <CDS_Portal> resource, the <CDS_Portal> resource may trigger the CDS to initiate a cross-discovery operation.

Only RETRIEVE operation should be allowed on a <CDS_Portal> virtual resource. A CREATE, an UPDATE, or a DELETE operation on a <CDS_Portal> virtual resource may not be supported.

The example process described in Table 7 may be used to trigger a corresponding CDS to initiate a cross-discovery operation and return the discovery result back to the requestor (e.g., an AE) of the retrieve request.

TABLE 7

| <CDS_Portal> RETRIEVE | |
|---|---|
| Associated Reference Point | Mca, Mcc and Mcc'. |
| Information in Request message | Parameters defined in "WoT Current Practices" apply with specific details for:<br>To: <CDS>/<CDS_Portal><br>The parameters carried in the request message may depend on the details of different solutions as described herein. If an entity is sending a request message to a CDS in a procedure related to a described embodiment, the request message may be embodied as sending a RETRIEVE request to the <CDS_Portal> resource, and different parameters may be carried, such as cross-domain Discovery Indicator (cdi), selected_Resource_Host (srh), and other parameters as described herein.<br>Content: void. |
| Processing at Originator before sending Request | According to "oneM2M Functional Architecture" |
| Processing at Receiver | The Receiver may check if the Originator has appropriate privileges. Otherwise according to "oneM2M Functional Architecture" |
| Information in Response message | Parameters defined in "WoT Current Practices" apply with specific details for:<br>Content: the cross-domain discovery result produced by CDS. |
| Processing at Originator after receiving Response | According to "oneM2M Functional Architecture" |
| Exceptions | According to "oneM2M Functional Architecture" |

For a oneM2M resource (such as <AE>, <container>, and/or <flexContainer> resources representing SL-compliant devices/things) which may be discoverable by external entities in another system (e.g., a WoT-compliant system), Table 8 describes new attributes that may be defined for those resources.

TABLE 8

New Resource Attributes for oneM2M Resource Representing SL-compliant Devices/things

| Attribute Name | Description |
| --- | --- |
| externallyDiscoverable | A new resource attribute called "externallyDiscoverable" may be defined for any resource that represents an SL-compliant thing/device/entity and may indicate whether this resource and corresponding thing are willing to be "discoverable" by external entities in another system, such as a WoT-compliant system or any other external systems. For example, if the value of a externallyDiscoverable attribute of a <oneM2M_Temperature_Sensor> resource does not include "WoT", when WoT Native Clients request a CDS for a cross-domain discovery operation in a oneM2M system, this <oneM2M_Temperature_Sensor> resource should not be included in the discovery list even if this resource meets the criteria as specified by the discovery requests of the WoT Native Clients. |
| externallyDiscoverableList | Alternatively, another new resource attribute called "externallyDiscoverableList" may be defined for any resource that represents an SL-compliant thing/device/entity and may indicate whether this resource and corresponding thing are willing to be discoverable by external entities in specified external systems. |

Alternatively, another approach to define whether a resource may be externally discoverable is to use an access control policy (ACP). For example, given a specific oneM2M resource (such as an <AE>, a <container>, or a <flexContainer> resource) that is externally discoverable, a new privilege may be defined in an ACP of this resource. For example, the privilege may be "accessControl Originators= CDS, accessControlOperations=cross domain discovery", which may indicate this resource may be discovered by a CDS for cross domain discovery purposes.

For oneM2M resources (such as <AE>, <container>, or <flexContainer> resources) representing external X-compliant devices/things, i.e., those resources that are IAs in the oneM2M system, Table 9 describes new attributes that may be defined for those resources.

TABLE 9

New Resource Attributes for oneM2M Resource Representing WoT-compliant Devices/things (i.e., as IAs)

| Attribute Name | Description |
| --- | --- |
| IAIndicator | A new resource attribute called "IAIndicator" may be defined for any resource that represents an X-compliant thing/device/entity, i.e., this resource is an IA. |
| externalSystemName | If a resource is an IA, this externalSystemName attribute may further indicate this IA is representing a device from a specific external system. For example, this attribute may set to the value of "WoT". By doing so, a service client may be able to determine that this resource is an IA representing a WoT-compliant device/thing. |
| dataSyncIndicator | This new attribute may indicate whether there is real-time data synchronization between the IA and its original device in the external system. |
| latestDataReadings | If there is real-time data synchronization between the IA and its original device in the external system (i.e., dataSyncIndicator = True), this attribute may store the latest data content of the original device in the external system. |

When the new attributes externallyDiscoverable and externallyDiscoverableList are used, they may support more efficient cross-domain discovery when a CDS uses a oneM2M resource discovery mechanism to identify interested SL resources as required by WoT Native Clients. Accordingly, a new filter criteria called "externalDiscoverableCriteria" is introduced and described in Table 10.

TABLE 10

New Filter Criteria conditions

| Condition tag | Multiplicity | Matching condition |
|---|---|---|
| externalDiscoverableCriteria | 0 . . . 1 | The externalDiscoverableCriteria attribute may have the following usages: 1. When externalDiscoverableCriteria is used as a Boolean flag, then it may be evaluated against the externallyDiscoverable attribute of a specific resource, e.g., <Resource-1>. For example, when externalDiscoverableCriteria is included in a resource discovery operation initiated by CDS, if the externallyDiscoverable attribute of <Resource-1> is "true", then Resource-1 may satisfy the externalDiscoverableCriteria such that Resource-1 may be included in the cross-domain discovery result and returned to clients in the WoT-compliant system. 2. Alternatively, externalDiscoverableCriteria may also include a list of external system names. Then it may be evaluated against the externallyDiscoverableList attribute of a specific resource, e.g., <Resource-1>. For example, when externalDiscoverableCriteria is included in a resource discovery operation initiated by CDS, if any of system names listed in the externallyDiscoverableList attribute of <Resource-1> are also in the list of names as specified in the externalDiscoverableCriteria, then Resource-1 may satisfy the externalDiscoverableCriteria such that Resource-1 may be included in the cross-domain discovery result and returned to clients in the WoT-compliant system. |

Example WoT TD Embodiment

Similar to a oneM2M system, a TD may also have the following enhancements. For a TD representing native WoT-compliant devices/things that are willing to be discoverable by external entities in another system (e.g., an SL-compliant system), Table 11 describes new metadata that may be included in the TD.

TABLE 11

New Metadata for WoT TD Representing WoT-compliant Devices/things

| Metadata Name | Description |
|---|---|
| externallyDiscoverable | A new metadata called "externallyDiscoverable" may be included in a TD that represents a native WoT-compliant thing/device/entity, and may be used to indicate whether this WoT thing is willing to be discoverable by external entities in another system, such as an SL-compliant system or any other external systems. For example, if the value of externallyDiscoverable of a TD does not include "oneM2M" when SL Native Clients ask CDS for cross-domain discovery in |

TABLE 11-continued

New Metadata for WoT TD Representing WoT-compliant Devices/things

| Metadata Name | Description |
| --- | --- |
| externallyDiscoverableList | WoT-compliant system, this TD should not be included in the discovery list even if this TD meets the needs as specified by the discovery request of SL Native Clients. Alternatively, another new metadata called "externallyDiscoverableList" may be included in a TD that represents a WoT-compliant thing/device/entity, and may be used to indicate whether this TD and corresponding WoT thing is willing to be discoverable by external entities in specified external systems. |

For a TD representing an external X-compliant device/thing, i.e., this TD is an IA in the WoT system, Table 12 describes new attributes that may be defined for those resources.

TABLE 12

New Metadata for TD Representing SL-compliant Devices/things as IAs

| Metadata Name | Description |
| --- | --- |
| IAIndicator | A new metadata called "IAIndicator" may be included in a TD that represents an X-compliant thing/device/entity, i.e., this TD is an IA. |
| externalSystemName | If a TD is an IA, this externalSystemName attribute may further indicate this IA is representing a device from specified external systems. For example, this metadata may be set to a value of "oneM2M". By doing so, a WoT native client may be able to determine that this TD is an IA representing a oneM2M-compliant device/thing. |
| dataSyncIndicator | This new metadata may indicate whether there is real-time data synchronization between the IA and its original device in the external system. |
| latestDataReadings | If there is real-time data synchronization between the IA and its original device in the external system (i.e., dataSyncIndicator = True), this new metadata may be included in a TD and may store the latest data content of the original device in the external system. Alternatively, the data may also be stored in a local resource of the TD host hosting this TD. If that is the case, this parameter may comprise the URI of this local resource on the TD host. Alternatively, if there is real-time data synchronization between the IA and its original device in the external system, and the latest data is not going to be directly stored in a TD but stored at the delegate servient, then this new metadata may be set to "Available at delegate servient". |

Example Graphical User Interface

To provide a convenient avenue for configuring or accessing any or all of the aforementioned parameters, an embodiment includes a user control panel. In particular, the interface may have a graphical user interface (GUI) that allows a user to input desired values for the parameters or access values of the parameters during entity setup and deployment. Such an example GUI can be seen in FIG. 27 for accessing the working modes of a CDS, as described herein. For example, depending on the specific context or application scenario, users may use such a GUI to view and configure the properties of a CDS. As can be seen in FIG. 27, selection buttons may be used to enter or change working modes. A user may also choose to receive a notification each time a CDS is switching from one working mode to another working mode during runtime.

Example Environment

Figure 28A:
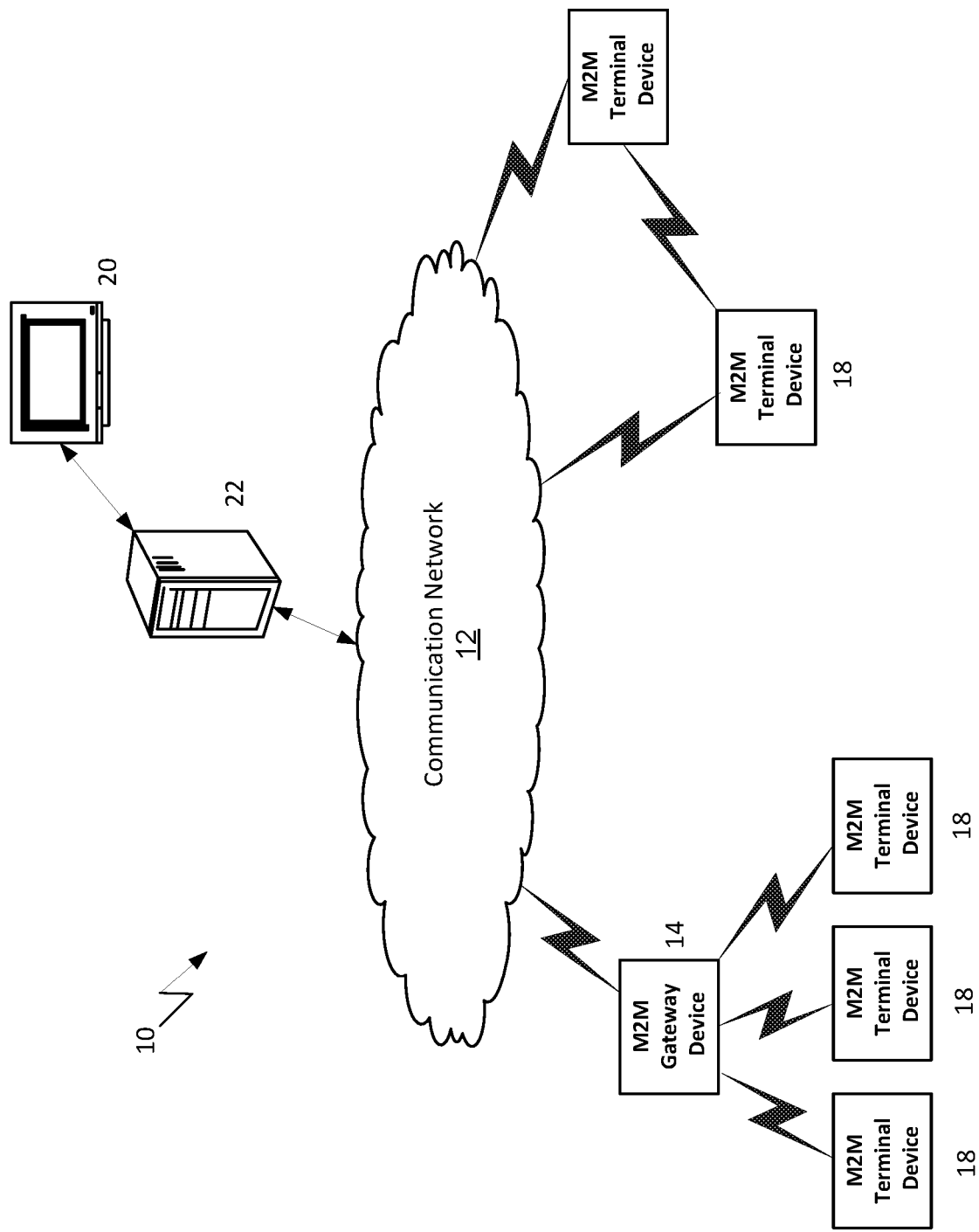
FIG. 28A is a system diagram of an example machine-to-machine (M2M), Internet of Things (IoT), or Web of Things (WoT) communication system in which one or more disclosed embodiments may be implemented.

FIG. 28A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 1, 4-24, or 26 may comprise a node of a communication system, such as the ones illustrated in FIGS. 28A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 28A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 28A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 28B:
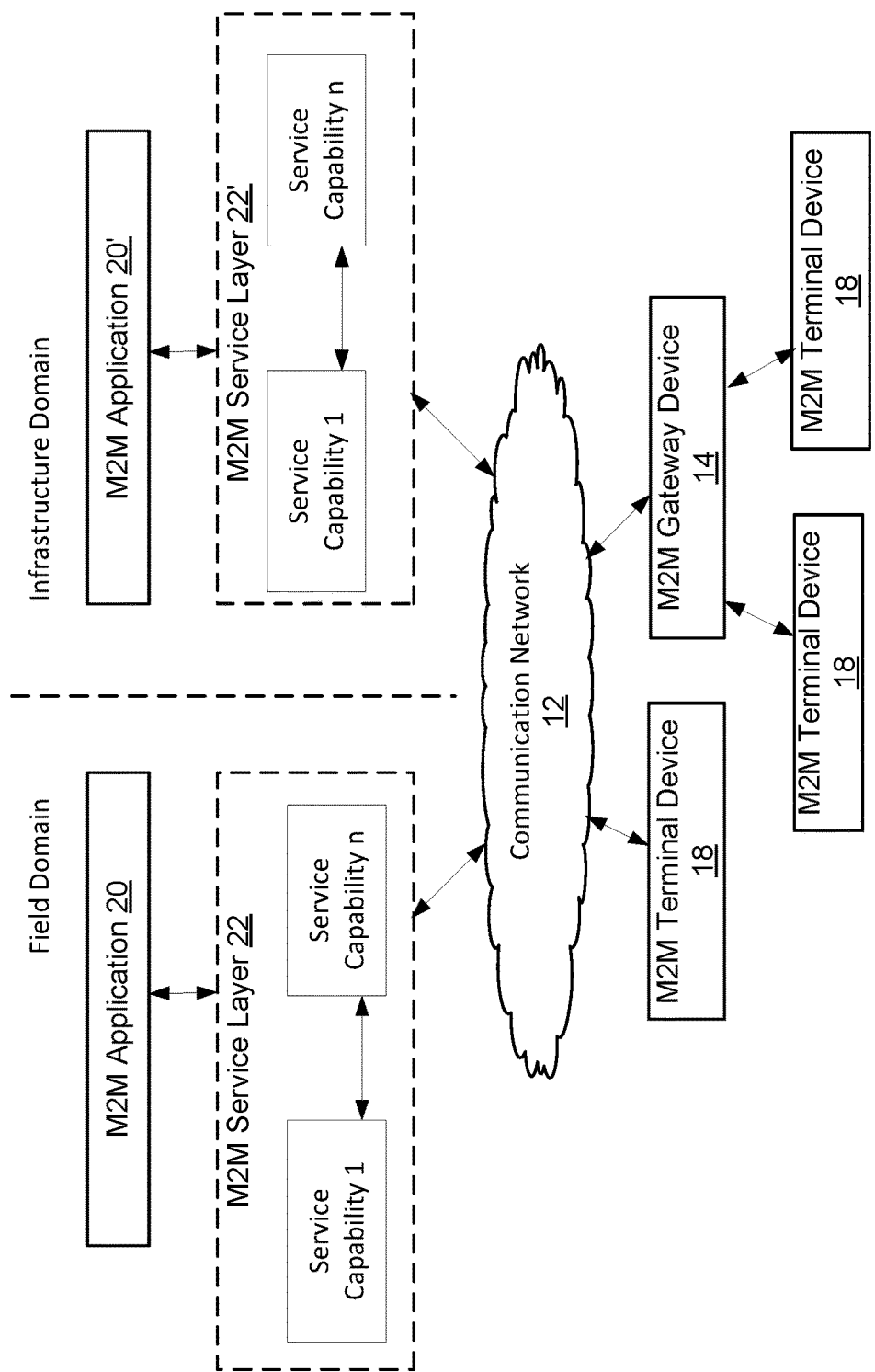
FIG. 28B is a system diagram of an example architecture that may be used within the M2M/IoT/WoT communications system illustrated in FIG. 28A.

Referring to FIG. 28B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 28B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 28B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 28C or FIG. 28D described below.

Further, the methods and functionalities described herein may be implemented as part of an M2M network that uses a Service Oriented Architecture (SOA) and/or a Resource-Oriented Architecture (ROA) to access services.

Figure 28C:
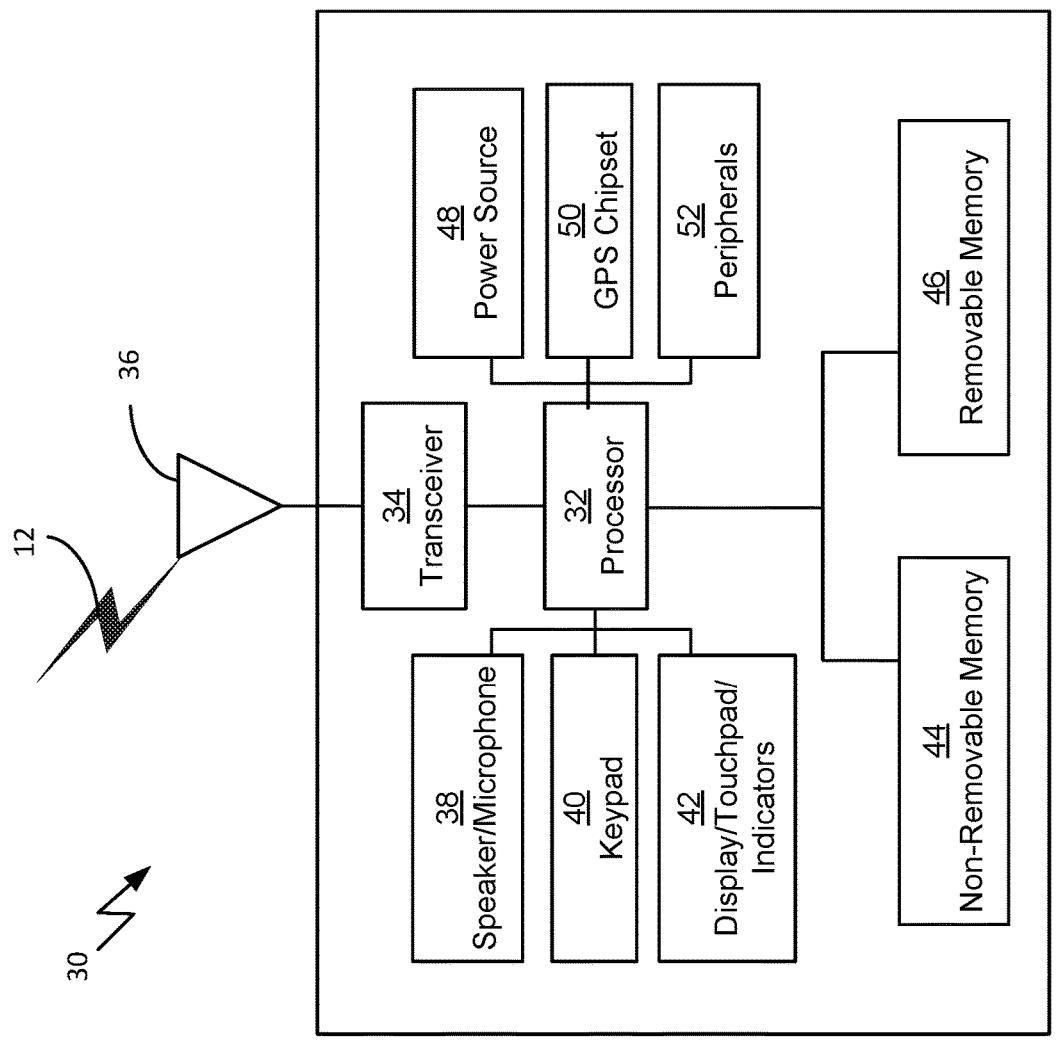
FIG. 28C is a system diagram of an example communication network apparatus, such as an M2M/IoT/WoT device, gateway, or server that may be used within the communications system illustrated in FIGS. 28A and 28B.

FIG. 28C is a block diagram of an example hardware/software architecture of a node of a network, such as one of the clients, servers, or proxies illustrated in FIG. 1, 4-24, or 26, which may operate as an M2M server, gateway, device, or other node in an M2M network such as that illustrated in FIGS. 28A and 28B. As shown in FIG. 28C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the cross-domain discovery service as described herein, e.g., in relation to the methods described in reference to FIGS. 8-22, 24, and 26, or the data structures of FIGS. 1-7, 9, 10, and 23-25, Tables 1-12, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 28C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., at least those in FIGS. 14-22 and 26) and in the claims. While FIG. 28C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 28C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node, and in particular underlying networks, applications, or other services in communication with the node. In one embodiment, the display/indicators 42 may present the graphical user interface illustrated in FIG. 27 and described herein.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 28D:
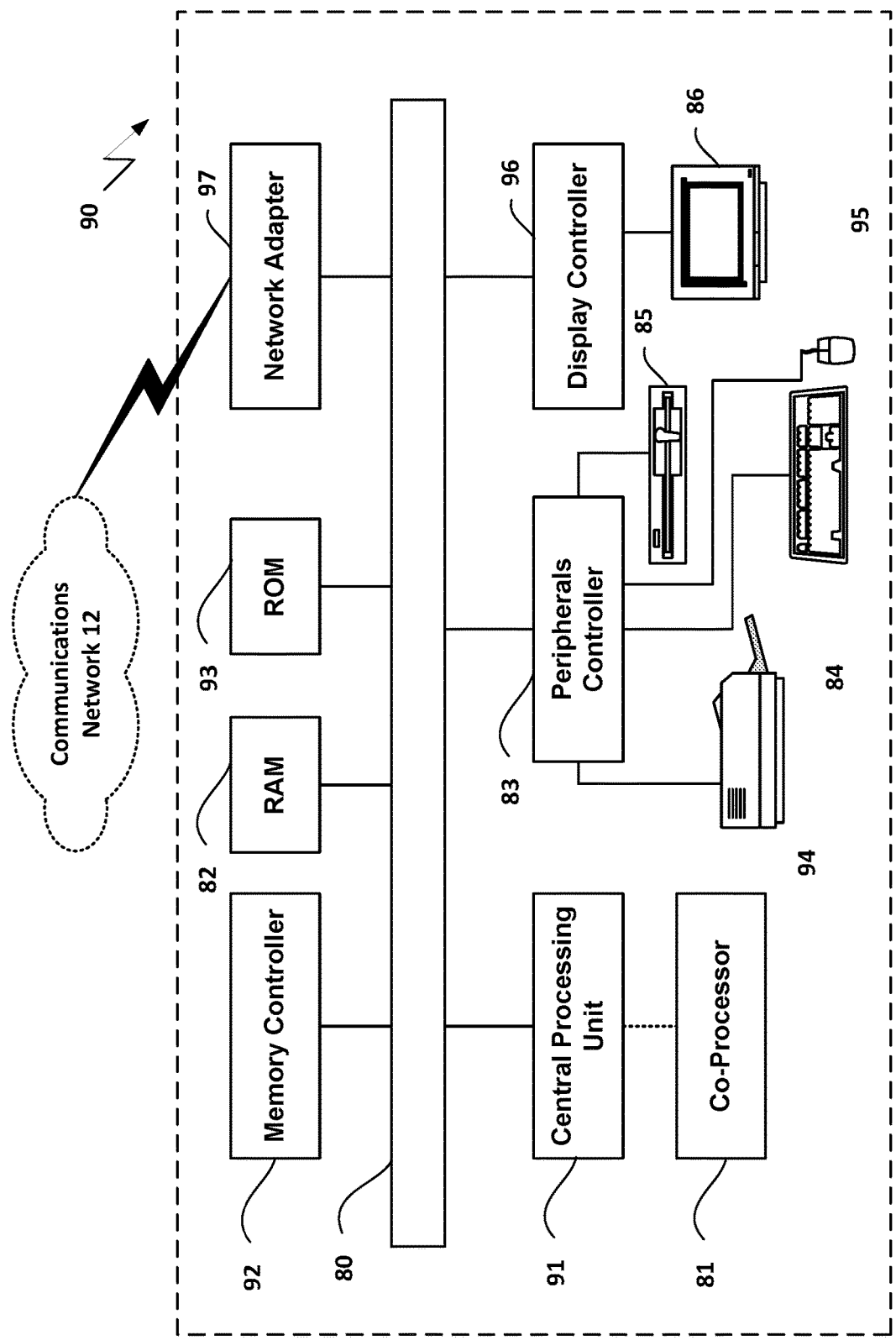
FIG. 28D is a block diagram of an example computing system in which a node or apparatus of the communication system of FIGS. 28A and 28B may be embodied.

FIG. 28D is a block diagram of an exemplary computing system 90 which may also be used to implement one or more nodes of a network, such as the clients, servers, or proxies illustrated in FIG. 1, 4-24, or 26 and described herein, which may operate as an M2M server, gateway, device, or other node in an M2M network such as that illustrated in FIGS. 28A and 28B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 27 and its accompanying description.

Further, computing system 90 may contain communication circuitry, such as for example a network adaptor 97, that may be used to connect computing system 90 to an external communications network, such as network 12 of FIG. 28A-D, to enable the computing system 90 to communicate with other apparatuses of the network. The communication circuitry, alone or in combination with the CPU 91, may be used to perform the transmitting and receiving steps described herein (e.g., at least those in FIGS. 14-22 and 26) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

The following is a list of acronyms relating to service level technologies that may appear in the above description. Unless otherwise specified, the definitions and acronyms used herein refer to the corresponding terms listed below.

| | |
|---|---|
| ADN | Application Dedicated Node |
| AE | Application Entity |
| API | Application Program Interface |
| ASN | Application Service Node |
| CDS | Cross-domain Discovery Service |
| CoAP | Constrained Application Protocol |
| CSE | Common Services Entity |
| CSF | Common Services Function |
| CRUD | CREATE, RETRIEVE, UPDATE, DELETE |
| JSON-LD | JavaScript Object Notation for Linked Data |
| HTTP | Hypertext Transfer Protocol |
| IA | Interworking Avatar |
| IG | Information Group |
| IN | Infrastructure Node |
| IN-CSE | CSE that resides in the Infrastructure Node |
| IOT | Internet of Things |
| IPE | Interworking Proxy Entity |
| M2M | Machine to Machine |
| MN | Middle Node |
| MN-CSE | CSE that resides in the Middle Node |
| NSE | Network Service Entity |
| RDF | Resource Description Framework |
| RESTful | Representational State Transfer |
| SL | Service Layer |
| SL-NC | SL-Native Client |
| SL-RH | RH-Resource Host |
| SPARQL | SPARQL Protocol and RDF Query Language |
| TD | Thing Description |
| TDR | TD Repository |
| URI | Uniform Resource Identifier |
| W3C | World Wide Web Consortium |
| WOT | Web of Things |
| WOT-NC | WoT-Native Client |
| WOT-T | WoT-Thing |
| WOT-S | WoT-Servient |
| XML | extensible Markup Language |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:

receive, in a first system compliant with a first communications protocol, via the communication network and from another apparatus on the network, a request message to conduct resource discovery for resources matching specified criteria, wherein the specified criteria comprises data content constraints;

determine resources in the first system that match the data content constraints of the specified criteria, wherein each resource has an associated uniform resource identifier (URI), wherein each resource comprises an interworking avatar (IA) comprising a representation of a resource from a second system, wherein the second system is not compliant with the first system and wherein the second system is compliant with a second communications protocol, wherein the representation of the resource from the second system comprises a format compliant with the first system, and wherein the IA comprises data content matching the data content constraints of the specified criteria; and send in the first system, via the communication network and to the other apparatus on the network, a response message indicating URIs of the resources comprising IAs that comprise data content matching the data content constraints of the specified criteria.

2. The apparatus of claim 1, wherein the request message comprises a SPARQL RDF-based query.

3. The apparatus of claim 1, wherein the request message comprises a parameter indicating cross-domain discovery should be performed.

4. The apparatus of claim 1, wherein the first system comprises a system compliant with a oneM2M service layer protocol.

5. The apparatus of claim 4, wherein the IAs comprise oneM2M resource representations of WoT Things.

6. The apparatus of claim 1, wherein the first system comprises a system compliant with a WoT protocol.

7. The apparatus of claim 6, wherein the IAs comprise Thing representations of oneM2M resources.

8. The apparatus of claim 1, wherein the specified criteria comprises a data content-related constraint.

9. The apparatus of claim 8, wherein the computer-executable instructions, when executed by the processor of the apparatus, further cause the apparatus to:

send, to a cross-domain discovery service, a request message for current data of a discovered IA from the resource from the second system the IA represents; and receive, from the cross-domain discovery service, a response message indicating current data of the IA.

10. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:

discover, based on a request, a resource in a first system compliant with a first communications protocol; and create, on a resource host in a second system not compliant with the first system, wherein the second system is compliant with a second communications protocol, an interworking avatar (IA) representing the discovered resource in the first system, wherein the IA comprises data content matching data content constraints specified in the request.

11. The apparatus of claim 10, wherein the first system comprises a system compliant with a WoT protocol.

12. The apparatus of claim 11, wherein the IA comprises a oneM2M resource representation of a WoT Thing.

13. The apparatus of claim 10, wherein the first system comprises a system compliant with a oneM2M service layer protocol.

14. The apparatus of claim 13, wherein the IA comprises a Thing representation of a oneM2M resource.

15. The apparatus of claim 10, wherein the computer-executable instructions, when executed by the processor of the apparatus, further cause the apparatus to:
  receive, from the second system, a request message for current data of the resource;
  determine the current data of the resource; and
  send, to the second system, a response message indicating current data of the resource.

16. The apparatus of claim 10, wherein the creating is initiated before any discovery requests are received.

17. The apparatus of claim 10, wherein the creating is initiated after receiving a request message for cross-domain discovery.

18. The apparatus of claim 10, wherein the computer-executable instructions, when executed by the processor of the apparatus, further cause the apparatus to:
  host a cross-domain discovery service.

19. The apparatus of claim 18, wherein the cross-domain discovery service comprises a common service function of a service layer.

20. The apparatus of claim 18, wherein the cross-domain discovery service comprises a oneM2M resource.

\* \* \* \* \*